(12) United States Patent
Booij

(10) Patent No.: US 10,208,971 B2
(45) Date of Patent: Feb. 19, 2019

(54) NAVIER-STOKES BASED INDOOR CLIMATE CONTROL

(71) Applicant: Nederlandse Organisatie voor toegepast-natuurwetenschappelijk onderzoek TNO, s-Gravenhage (NL)

(72) Inventor: Paul Sebastian Booij, s-Gravenhage (NL)

(73) Assignee: Nederlandse Organisatie voor toegepast-natuurewetenschappelijk onderzoek TNO, 's-Gravenhage (NL)

( * ) Notice: Subject to any disclaimer, the term of this patent is extended or adjusted under 35 U.S.C. 154(b) by 148 days.

(21) Appl. No.: 15/123,706

(22) PCT Filed: Mar. 10, 2015

(86) PCT No.: PCT/NL2015/050150
§ 371 (c)(1),
(2) Date: Sep. 6, 2016

(87) PCT Pub. No.: WO2015/137803
PCT Pub. Date: Sep. 17, 2015

(65) Prior Publication Data
US 2017/0074535 A1    Mar. 16, 2017

(30) Foreign Application Priority Data
Mar. 10, 2014 (EP) .................... 14158662

(51) Int. Cl.
*G05B 21/00* (2006.01)
*F24F 11/00* (2018.01)
(Continued)

(52) U.S. Cl.
CPC .......... *F24F 11/006* (2013.01); *F24F 11/30* (2018.01); *F24F 11/62* (2018.01); *G05B 19/048* (2013.01);
(Continued)

(58) Field of Classification Search
CPC .......... F24F 11/62; F24F 11/30; F24F 11/006; F24F 11/63; G05B 19/048; G05B 2219/2614; G05D 23/1928; G05D 23/1917
See application file for complete search history.

(56) References Cited

U.S. PATENT DOCUMENTS 7,389,151 B2 * 6/2008 Badami .................. F01K 13/02
                                                       700/28
7,542,885 B1 * 6/2009 Majumdar .......... G06F 17/5018
                                                       700/83
(Continued)

FOREIGN PATENT DOCUMENTS

WO    2012040479 A2    3/2012
WO    2013130956       9/2013

OTHER PUBLICATIONS

Oldewurtel, Frauke et al. "Use of model predictive control and weather forecasts for energy efficient building climate control". Energy and Buildings 45 (2012) 15-27.*
(Continued)

*Primary Examiner* — Adam Lee
(74) *Attorney, Agent, or Firm* — Banner & Witcoff, Ltd.

(57) ABSTRACT

A data processor (4) is disclosed that can be used in a climate control system (1) for controlling a climate in an indoor space (10) or in a design system (20) for designing such a climate control system.
The data processor jointly resolves a set of coupled optimization problems of the following form:

$$z_\Phi^k = \mathrm{argmin}_{Z_\Phi} ([S_\Phi^{k1}\ O]z_\Phi - \tilde{\Phi}^{k1})^T Q_\Phi^k ([S_\Phi^{k1}\ O]z_\Phi - \tilde{\Phi}^{k1}) + \quad (5a)$$
$$([O\ I]_{Z_\Phi})^T R_\Phi^k ([O\ I]_{Z_\Phi})$$

(Continued)

-continued subject to $$[A_\Phi^k - B_\Phi^k]z_\Phi - b_\Phi^{\prime k}(\Phi^k, e_\Phi^k) = 0 \qquad (5b)$$

wherein:

$$z_\Phi = \begin{bmatrix} \Phi \\ q_\Phi \end{bmatrix}$$

is an augmented state-vector comprising a vector $\Phi$ specifying the spatial distribution of a climate related variable with respect to a plurality of spatial cells, and a source term $q_\Phi$ to be resolved, and wherein $$\tilde{z}_\Phi^k = \begin{bmatrix} \tilde{\Phi}^{k+1} \\ q_\Phi^k \end{bmatrix}$$

is the solution found for point in time k+1, $\tilde{\Phi}^{k+1}$ being a vector specifying a setpoint specified for said climate related variable at point in time k+1 for at least a part of said plurality of cells, $e_\Phi^k$ are boundary conditions relevant for said climate related variable at point in time k, S is a selection matrix, selecting cells for said distribution having a setpoint, O is the zero matrix, I is the identity matrix and Q and R are weighting matrices for tracking and energy consumption, wherein $A_\Phi$ is a matrix that defines the development of vector $\Phi$ as a function of one or more other vectors of climate related variables, wherein $B_\Phi$ is a matrix that maps the source terms for field $\Phi$ to the cell field values affected by those source terms, and wherein the data processor (4) controls the plurality of said actuators in accordance with the source term $q_\Phi$.

19 Claims, 11 Drawing Sheets

(51) Int. Cl.
- *F24F 11/30* (2018.01)
- *F24F 11/62* (2018.01)
- *G05D 23/19* (2006.01)
- *G05B 19/048* (2006.01)
- *F24F 11/63* (2018.01)

(52) U.S. Cl.
CPC ..... *G05D 23/1917* (2013.01); *G05D 23/1928* (2013.01); *F24F 11/63* (2018.01); *G05B 2219/2614* (2013.01)

(56) References Cited

U.S. PATENT DOCUMENTS

| | | | |
|---|---|---|---|
| 7,558,649 B1* | 7/2009 | Sharma | G06F 17/5009 236/49.3 |
| 7,620,613 B1* | 11/2009 | Moore | H05K 7/20836 700/28 |
| 7,644,051 B1 | 1/2010 | Moore et al. | |
| 7,676,280 B1* | 3/2010 | Bash | H05K 7/20836 700/17 |
| 7,991,488 B2* | 8/2011 | Viele | F02D 41/26 123/447 |
| 8,768,519 B2* | 7/2014 | Nagamatsu | H05K 7/20836 361/688 |
| 2003/0146290 A1* | 8/2003 | Wang | B60H 1/00735 236/49.3 |
| 2003/0200050 A1* | 10/2003 | Sharma | F24F 11/62 702/132 |
| 2003/0221821 A1* | 12/2003 | Patel | G05D 1/024 165/247 |
| 2004/0254686 A1* | 12/2004 | Matsui | F24F 7/065 700/291 |
| 2005/0267639 A1* | 12/2005 | Sharma | G05D 23/1931 700/276 |
| 2007/0038414 A1* | 2/2007 | Rasmussen | G06F 1/206 703/1 |
| 2007/0055392 A1* | 3/2007 | D'Amato | G05B 13/048 700/44 |
| 2008/0131258 A1* | 6/2008 | Liepold | F04D 27/0269 415/1 |
| 2008/0281472 A1* | 11/2008 | Podgorny | G05B 15/02 700/276 |
| 2009/0222139 A1* | 9/2009 | Federspiel | G05D 22/02 700/278 |
| 2010/0131109 A1* | 5/2010 | Rasmussen | G06F 1/206 700/277 |
| 2010/0326075 A1* | 12/2010 | Fong | F01K 25/06 60/650 |
| 2011/0106314 A1* | 5/2011 | Beitelmal | H05K 7/20836 700/276 |
| 2011/0115223 A1* | 5/2011 | Stahlkopf | F01K 13/02 290/7 |
| 2011/0270464 A1* | 11/2011 | Marwah | G05D 23/1932 700/300 |
| 2011/0301723 A1* | 12/2011 | Pekar | G05B 13/048 700/29 |
| 2012/0040601 A1* | 2/2012 | Harayama | F24F 11/30 454/258 |
| 2012/0071992 A1* | 3/2012 | VanGilder | H05K 7/20745 700/90 |
| 2012/0072181 A1* | 3/2012 | Imani | G06F 17/5004 703/1 |
| 2012/0078417 A1* | 3/2012 | Connell, II | B25J 5/00 700/248 |
| 2012/0197444 A1* | 8/2012 | Wang | G05D 23/1932 700/276 |
| 2012/0209435 A1* | 8/2012 | Harayama | F24F 11/0086 700/276 |
| 2012/0290135 A1* | 11/2012 | Bentivegna | G05D 23/1934 700/276 |
| 2012/0323376 A1* | 12/2012 | Honda | G05D 23/1932 700/276 |
| 2012/0323382 A1* | 12/2012 | Kamel | G05F 1/66 700/286 |
| 2013/0006426 A1* | 1/2013 | Healey | H05K 7/20836 700/278 |
| 2013/0035794 A1 | 2/2013 | Imani | |
| 2013/0085616 A1* | 4/2013 | Wenzel | G05F 1/66 700/278 |
| 2013/0144444 A1 | 6/2013 | Ligeret | |
| 2013/0275097 A1* | 10/2013 | Milburn | H05K 7/20745 703/2 |
| 2013/0282146 A1* | 10/2013 | Lu | G05B 19/042 700/29 |
| 2013/0314694 A1* | 11/2013 | Tchoryk, Jr. | G01S 17/95 356/28.5 |
| 2014/0039688 A1* | 2/2014 | Saisu | G05D 23/19 700/276 |
| 2014/0039689 A1* | 2/2014 | Honda | G05B 15/02 700/276 |
| 2014/0049905 A1* | 2/2014 | Manzer | H05K 7/20836 361/679.46 |
| 2014/0277757 A1* | 9/2014 | Wang | G05D 23/1927 700/276 |
| 2014/0277760 A1* | 9/2014 | Marik | F24F 11/00 700/276 |
| 2014/0330447 A1* | 11/2014 | VanGilder | G05D 23/1917 700/300 |

(56) References Cited

U.S. PATENT DOCUMENTS

| | | | | |
|---|---|---|---|---|
| 2015/0045967 A1* | 2/2015 | Mori | ............. | F24F 3/065 |
| | | | | 700/277 |
| 2015/0057828 A1* | 2/2015 | Civilini | ............. | G05B 13/048 |
| | | | | 700/299 |
| 2015/0234779 A1* | 8/2015 | Raghunathan | ............. | G06F 17/11 |
| | | | | 708/446 |
| 2015/0308103 A1* | 10/2015 | Dyson | ............. | F24F 7/00 |
| | | | | 165/47 |

OTHER PUBLICATIONS

Freire, Roberto et al. "Predictive controllers for thermal comfort optimization and energy savings". Energy and Buildings 40 (2008) 1353-1365.*

Nguyen, Duong Tung et al. "Joint Optimization of Electric Vehicle and Home Energy Scheduling Considereing User Comfort Preference". IEEE Transactions on Smart Grid, 2012.*

Booij, P.S., et al., "Localized climate control in greenhouses," Nonlinear Model Predictive Control, Aug. 23, pp. 454-459.

Patankar, S., et al., "Numerical Heat Transfer and Fluid Flow," Jan. 1, 1981, pp. 126-131.

Jiri Cigler et al: "Subspace identification and model predictive control for buildings", Control Automation Robotics & Vision (ICARCV), 2010 11th International Conference on, IEEE, Dec. 7, 2010 (Dec. 7, 2010), pp. 750-755, XP031900045, DOI:10.1109/ICARCV.2010.5707821 ISBN: 978-1-4244-7814-9.

Aug. 25, 2014—Extended European Search Report of EP 14158662.8.

Jul. 8, 2015—International Search Report and Written Opinion of PCT/NL2015/050150.

Abergel, F. et al, "On Some Control Problems in Fluid Mechanics", Theoretical and Computational Fluid Dynamics, (1990) 1: 303-325.

\* cited by examiner

FIG. 5      For u and similar for v and w

NAVIER-STOKES BASED INDOOR CLIMATE CONTROL

BACKGROUND OF THE INVENTION

Field of the Invention

The present invention relates to a method for controlling an indoor climate.

The present invention further relates to a data processor for controlling an indoor climate.

The present invention further relates to system comprising such a data processor.

The present invention further relates to a system for designing an indoor climate control system.

The present invention further relates to a method for designing an indoor climate control system.

The present invention further relates to a computer program product.

Related Art

An indoor climate includes various aspects that may have to be controlled, such as temperature, humidity, air movement, and CO2 concentration. An indoor climate is subject to various spatial and temporal dynamics that are in particular determined by air circulation. This phenomenon renders it difficult to provide for a homogeneous setting of climate variables as temperature, humidity, air movement, CO2 concentration in the indoor space for which the climates has to be controlled. As a result of temperature differences, air leakage (through walls, windows, etc.) and forced ventilation (fans, air conditioning etc.) air currents occur. Even a slight change in, for example, the weather conditions, the geometry of the space and the climate installations, may have substantial effects on the flow field and hence on the entire indoor climate.

The spatial dynamics are particularly evident in large open spaces. A greenhouse is a telling example. In a greenhouse of some hectares significant temperature and humidity differences can easily occur that lead to inconsistent quality and growth rate of the crop. As a result of the temperature differences water vapor may locally condense and can cause mold. Condensation of water and the resulting mold may also occur due to a local lack of air movement. Preventing this by air-conditioning systems is power consuming. Providing for additional ventilation, by opening windows for example, reduces the CO2 concentration and also may result in energy losses.

Current climate control systems do not adequately address these problems. According to one known approach a feedback loop is provided that receives input for a climate variable, such as the temperature, from a single sensor and that controls an actuator, e.g. a heater, on the basis of the sensed value for the variable and a set point.

Modern greenhouses apply zoned climate control. Therein several sensor-loop actuator systems are distributed in the controlled indoor space that operate mutually independent of each other. This can lead to inefficiencies, in particular if sensor-loop actuator systems are provided that control mutually different conditions, such as a temperature and a humidity.

Climate control arrangements are known that adapt their operation to current and predicted weather conditions outside the controlled indoor space. These arrangements however do not address the dynamical interactions inside the controlled indoor space.

A common strategy to achieve, particularly in the horticultural industry, a common environment is active mixing of air by artificially induced air flows. Therewith it is attempted to stir the air in order to obtain spatially uniformly distributed climate conditions as temperature and humidity. In practice, however, the effects are usually mediocre. Often natural air flows tend to dominate artificially induced air flows. Moreover, the equipment such as fans used to artificially induce air flows is not properly regulated and tend to be used on a continuous basis regardless the instantaneous state of the indoor climate, therewith consuming a substantial amount of power.

A theoretical framework modeling the behavior of the variables of interest is discussed for example in Suhas V. Patankar, "Numerical Heat Transfer and Fluid Flow", ISBN 0-07-1980 048740-S on page 15. As set out therein, the following general differential equation applies to each variable:

$$\frac{\partial}{\partial t}(\rho\phi) + \mathrm{div}(\rho u \phi) = \mathrm{div}(\Gamma \ \mathrm{grad} \ \phi) + S$$

Therein $\Gamma$ is the diffusion coefficient and $S$ is the source term. The quantities $\Gamma$ and $S$ are specific to a particular meaning of $\phi$. The four terms in the general differential equation are the unsteady term, the convection term, the diffusion term, and the source term. The dependent variable $\phi$ can stand for a variety of different quantities, such as the mass fraction of a chemical species, the enthalpy or the temperature, a velocity component, the turbulence kinetic energy, or a turbulence length scale. Accordingly, for each of these variables, an appropriate meaning will have to be given to the diffusion coefficient and the source term S. For example, in case the dependent variable $\phi$ is a temperature field, then the source term is a thermal source term, like power added through the floor heating and heating and power extracted by air conditioning.

Computational Fluid Dynamic (CFD) methods are known to simulate the indoor climate given boundary conditions as outside temperature, sun, floor and wall temperatures and source terms such as heaters and air conditioning devices. These methods typically apply a Finite Volume Method (FVM)) wherein the indoor space is discretized into cells, each of which has its own temperature, 3D flow velocity and pressure. For example, in the implementation known as "SIMPLE" (Semi-Implicit Method for Pressure Linked Equations) the following sets of equations for energy, momentum and pressure correction are used. The "SIMPLE" method is described in more detail in Patankar referred to above on pp. 126-131. The equations include the following discretized Navier-Stokes equations with an additional energy equation.

Energy:

$$A_T(u,v,w)T = b_T(T^k, q_T^k, e_T^k) \tag{1}$$

Momentum $$A_u(u,v,w,P)\hat{u} = b_u(u^k, q_u^k, e_u^k) \tag{2a}$$

$$A_v(u,v,w,P)\hat{v} = b_v(v^k, q_v^k, e_v^k) \tag{2b}$$

$$A_w(u,v,w,P)\hat{w} = b_w(T, w^k, q_w^k, e_w^k) \tag{2c}$$

Pressure Correction $$A_P(\hat{u},\hat{v},\hat{w},P)P' = b_P(\hat{u},\hat{v},\hat{w}) \tag{3}$$

Therein the vectors T, u, v, w, P contain the temperature field, the air velocity in x, y, and z directions and pressure field respectively, for time step k+1. The results obtained for k+1 may be one of a series of results being followed by the results for k+2, k+3 etc. Alternatively the results for k+1 may be considered as a steady state solution. In the sequel of this description the symbol Φ will also be used to denote a field in general and this symbol may be provided with an index referring to a specific type of field. For example $\phi_T^k$ indicates a temperature field at time step k (which is assumed known as it results from the previous simulation step).

The vectors $\hat{u}, \hat{v}, \hat{w}$ are uncorrected velocity vectors, i.e. velocity vectors that jointly do not meet the law of conservation of mass.

The vector P' is a pressure correction field. This field serves to correct $\hat{u}, \hat{v}, \hat{w}$ into fields u,v,w that do adhere to mass conservation.

The source terms are denoted by the character "q". E.g. $q_T$ is a vector of thermal source terms, like power added through the floor heating and heating and power extracted by the airconditioning. Exogenous inputs or boundary conditions are indicated by the symbol "e", e.g. the outside weather conditions, an opened or closed state of windows etc.

Each matrix A is of size N×N, with N the amount of cells in the grid. In practice, the amount of cells may range from thousands to millions. Accordingly, these matrices can become very large. They are largely sparse, but their structure can be time dependent. E.g. in the energy equation, not only the entries of $A_T$ change as air flow changes, but also their location. I.e. the temperature of a certain cell might depend on the temperature of its left neighbor if u is positive there, but it will depend on the temperature of its right neighbor if the flow changes direction.

The SIMPLE method solves these 5 sets jointly. This is an iterative method involving the following sequence of steps that is repeated until convergence of this set of equations occurs.

Step 1: solve u* from $$A_u(u,v,w,P)u^* = b_u(u^k, q_u^k, e_u^k)$$

$$A_u(v,w,P)\hat{u} = b_u(u^k, q_u^k, e_u^k) \quad (2a)$$

Step 2: update $\hat{u}$ with $$\hat{u} = (1-\alpha)u + \alpha u^* \quad (2aa)$$

Step 3: solve v* from $$A_v(u,v,w,P)v^* = b_v(v^k, q_v^k, e_v^k)$$

$$A_v(u,w,P)\hat{v} = b_v(v^k, q_v^k, e_v^k) \quad (2b)$$

Step 4: update $\hat{v}$ with $$\hat{v} = (1-\alpha)v + \alpha v^* \quad (2ba)$$

Step 5: solve w* from $$A_w(u,v,w,P)w^* = b_w(w^k, q_w^k, e_w^k, T) \quad (2c)$$

Step 6: update $\hat{w}$ with $$\hat{w} = (1-\alpha)w + \alpha w^* \quad (2ca)$$

Step 7: solve P' from $$A_P(\hat{u},\hat{v},\hat{w},P)P' = b_P(\hat{u},\hat{v},\hat{w})$$

$$A_P(u,v,w)P' = b_P(u,v,w) \quad (3)$$

Step 8: update P with $$P = P + \alpha_P P' \quad (3a)$$

Step 9: update u,v,w with the correction $$(u,v,w) = f((\hat{u},\hat{v},\hat{w}), P')$$

$$(u,v,w) = f((u,v,w), P') \quad (4)$$

Step 10: solve T* from $$A_T(u,v,w)T = b_T(T^k, q_T^k, e_T^k)$$

$$A_T(u,v,w)T^* = b_T(T^k, q_T^k, e_w^k) \quad (1)$$

Step 11: Update T with $$T = (1-\alpha)T + \alpha T^*$$

In the equations above, the variables $x^k$ are the variables for which values are determined for point in time k. The remaining variables are part of the iteration procedure for computation of the result for k+1. As becomes apparent from the above, the joint set of equations can be solved in a sequential manner. Alternatively one or more equations may be solved in a parallel manner.

The known method allows the skilled person to simulate the effect of climate control measures as is illustrated in FIG. 1A. The skilled person desiring to achieve a particular indoor climate can specify certain control measures according to a design d, such as heaters and air conditioning devices, as well as their settings and simulate the effect thereof on the indoor climate to be controlled. The above-mentioned simulation method, symbolically indicated as block CFD (FVM), then simulates the effect of the specified measures as indicated by the vector x=(T, u, v, w, P) on the indoor climate. Based on this outcome and his expert knowledge the skilled person can choose a new design $d^{i+1}$ and verify if this more closely achieves a desired result. The skilled person may for example verify if the estimated values for the climate variables sufficiently comply with the desired values for those variables and if this is achieved within an available energy budget. In this way the skilled person can by trial and error provide specifications d* for a climate control system that sufficiently achieves the desired indoor climate conditions.

This known method still has a disadvantage that it requires intensive human effort to arrive at a reasonable system specification and that it is not guaranteed that the specifications found in this way indeed provide for a globally optimal solution. Also, this method requires many simulation steps, each of which might require long computation times. Moreover, the known method is not suitable to adapt the settings of the system to the prevailing conditions, the current outdoor temperature, incoming solar radiation, the changes in air flow during a longer period caused by crop growth in the indoor space.

To overcome this last problem, a real-time control system can be used.

By way of example, PCT patent application WO2013130956 pertains to control of an environmental maintenance system that includes a plurality of sensors and a plurality of actuators. The operation levels of the actuators can be determined by optimizing a cost function subject to a constraint, e.g., having no more than a certain number of sensors that are out of range. A predictor model can predict whether certain operation levels of the actuators violate the constraint. The search for acceptable operation levels (i.e., ones that do not violate constraints) can be performed by analyzing points on lines in an N-dimensional space, where N is the number of actuators. The subset of acceptable operation levels along with a cost function (e.g., that incorporates energy consumption information) can be used to change operation levels of the modules to keep the temperatures within a desired range while using minimal energy.

Sequential Quadratic Programming (SQP) is a generic technique for optimization purposes. In this method, a cost function $J(x,q)=(x-\tilde{x})^T Q(x-\tilde{x})+q^T Rq$ is to be minimized by proper choice of settings for the source terms q. The optimal settings for the source terms q are found by simulating the system with iterant $q^i$, leading to indoor climate $x^i$. Q and R are weighting matrices for tracking and energy consumption respectively. The combination $(q^i,x^i)$ leads to scalar cost $J^i$. A new iterant $q^{i+1}$ is found by a gradient descent method. The derivative of J(x,q) to $q^i$ is calculated and $q^{i+1}$ is taken as a function of this derivative. The process stops when there is no significant change between subsequent iterants.

The method has the following drawbacks. Firstly, calculating the derivative of J(x,q) to q is generally only possible by numerical approximation and this requires much computational effort. Secondly, the method requires multiple simulation steps to be performed. Since simulation steps are computationally expensive it is likely that this method will not be able to run in real-time. Various efforts exist for simplifying the approximation of the derivative, for instance with the Adjoint SQP method as schematically illustrated in FIG. 1B, but the requirement of multiple simulation steps remains. Accordingly, there is a need for improvement.

SUMMARY OF THE INVENTION

It is a first object of the present invention to provide a data processor that renders it possible to at least alleviate one or more of these problems. In accordance therewith a data processor is provided as claimed in claim 1.

It is a second object of the present invention to provide a climate control system that at least alleviate one or more of these problems.

In accordance therewith a climate control system is provided as claimed in claim 3.

It is a third object of the present invention to provide a design system including the data processor that renders it possible to at least alleviate one or more of these problems.

In accordance therewith a design system is provided as claimed in claim 7. It is a fourth object of the present invention to provide a data processing method that renders it possible to at least alleviate one or more of these problems. In accordance therewith a data processing method is provided as claimed in claim 8.

It is a fifth object of the present invention to provide a climate control method that at least alleviates one or more of the problems identified above.

In accordance therewith a method is provided as claimed in claim 9.

It is a sixth object of the present invention to provide a design method that at least alleviates one or more of the problems identified above. In accordance therewith a method is provided as claimed in claim 14.

It is a seventh object of the present invention to provide a computer program product comprising a computer program, which when executed by a programmable processor enables the programmable processor to at least alleviate one or more of the problems identified above.

In accordance therewith a computer program product is provided as claimed in claim 15.

According to the present invention a method is provided that jointly resolves a set of coupled optimization problems of the following form:

$$z_\Phi^k = \arg\min_{z_\Phi}([S_\Phi^{k+1} O]z_\Phi - \tilde{\Phi}^{k+1})^T Q_\Phi^k([S_\Phi^{k+1} O]z_\Phi - \tilde{\Phi}^{k+1}) + ([OI]z_\Phi)^T R_\Phi^k([OI]z_\Phi) \quad (5a)$$

Subject to $[A_\Phi^k - B_\Phi^k]z_\Phi - b'_\Phi{}^k(\Phi^k, e_\Phi^k) = 0$ (5b)

Therein, $$z_\Phi = \begin{bmatrix} \Phi \\ q_\Phi \end{bmatrix}$$

is an augmented state vector. Contrary to the known methods discussed above, such as the method disclosed in the above-mentioned PCT-patent application and the generic SQP approach, the augmented state vector includes, in addition to the field Φ to be controlled, also the source terms $q_\Phi$ for that field. Therein further $$z_\Phi^k = \begin{bmatrix} \Phi^{k+1} \\ q_\Phi^k \end{bmatrix}$$

is the optimum value found for the augmented state vector $$z_\Phi = \begin{bmatrix} \Phi \\ q_\Phi \end{bmatrix}$$

in the coupled set of equations starting from the data established at point in time k. The augmented state vector comprises an estimated optimum field vector $\Phi^{k+1}$ for the field Φ at point in time k+1 that is expected to be achieved with an estimated optimum source term $q_\Phi^k$ for the source term $q_\Phi$ to be optimized respectively. The term $e_\Phi^k$ represents boundary conditions relevant for said climate related variable at point in time k.

The augmented state vector only has a modestly increased dimension as compared to the original state vector for the field Φ, as the number of source terms typically is substantially smaller than the number of cells of the space. For example for a space portioned in thousands we may for example have in the order of a few or a few tens of source terms. If the space is partitioned in millions the number of source terms is for example in the order of a few tens.

Contrary to said known methods, the present invention pertains to a synchronous mode of operation, as specified above in formula's 5a, 5b, wherein the inner optimization loop optimizes an augmented (artificial) variable z that includes the controlled field as well as the source term for the controlled field. In this way a setting that minimizes the cost function can be determined more efficiently.

Vector $\tilde{\Phi}^k$ specifies setpoints for said climate related variable at point in time k for at least a part of said plurality of cells. Further $S_\Phi$ is a selection matrix, selecting cells for said distribution having a setpoint, O is the zero matrix, I is the identity matrix and $Q_\Phi^k$ and $R_\Phi^k$ are weighting matrices for tracking and energy consumption. Furthermore therein $A_\Phi$ is a matrix that defines the development of vector Φ as a function of one or more other vectors of climate related variables. The matrix $B_\Phi^k$ maps the source terms $q_\Phi$ for field Φ to the field values directly affected by those source terms. The resolution of the linearly constrained quadratic optimization problem according to the present invention results in a solution $z_\Phi^*$ that includes both the values for source terms $q_\Phi$ and the values of the controlled climate vector Φ that are expected to be achieved with those values of the source terms. Upon completion of the iterative process a next value $$\check{z}_\Phi^k = \begin{bmatrix} \Phi^{k+1} \\ q_\Phi^k \end{bmatrix}$$

is established. A set of actuators may then be controlled at point in time k in accordance with the values for source terms $q_\Phi{}^k$ found, which is expected to result in the field $\Phi^{k+1}$ at the subsequent point in time k+1. As the values for the source terms are obtained as a solution of a linearly constrained quadratic problem, it is guaranteed that the found solution is indeed the globally optimal solution that could be reached. The results obtained for k may be one of a series of results being followed by the results for k+1, k+2 etc. Alternatively the results for k+1 may be considered as a steady state solution.

As recognized by the inventor the following approach of the problem of properly controlling an indoor climate is possible is based on the introduction of an augmented state vector $$z_\Phi = \begin{bmatrix} \Phi \\ q_\Phi \end{bmatrix}.$$

Therein vector $\Phi$ specifies the field to be controlled and $q_\Phi$ comprises the source terms for that field to be optimized. In the following way this enables a redefinition of the optimization problem.

In a first step, the energy equation (1) is rewritten as follows:

When written out (arguments for the components of matrix $A_T$ and for the components of vector $b_T$ not shown)

$$\begin{pmatrix} A_{11} & \cdots & A_{1n} \\ \cdots & \cdots & \cdots \\ A_{n1} & \cdots & A_{nn} \end{pmatrix} \begin{pmatrix} T_1 \\ \vdots \\ T_n \end{pmatrix} = \begin{pmatrix} b_1 \\ \vdots \\ b_n \end{pmatrix}$$

The vector $b_T(T^k, q_T^k, e_T^k)$ is a linear function of its arguments that can be written as follows:

$$b_T(T^k, q_T^k, e_T^k) = B_T q_T^k + B_0 T^k + B_e e_T^k = B_T q_T^k + b'_T(T^k, e_T^k)$$

The boundary conditions "e" may be provided in various ways. In an embodiment the walls enclosing the indoor space are represented by cells in the model, and the boundary conditions are the conditions prevailing outside the walls, such as the weather conditions. Alternatively, the walls may not be represented by cells in the model and the wall temperatures may be part of the boundary conditions.

Substituting this in equation (1) gives the following result:

$$\begin{pmatrix} A_{11} & \cdots & A_{n1} & -B_{T11} & \cdots & -B_{T1m} \\ \vdots & \cdots & \vdots & \vdots & \cdots & \vdots \\ A_{n1} & \cdots & A_{nn} & -B_{Tn1} & \cdots & -B_{Tnm} \end{pmatrix} \begin{pmatrix} T_1 \\ \vdots \\ T_n \\ q_{T1}^k \\ \vdots \\ q_{Tm}^k \end{pmatrix} - b'_T(T^k, e_T^k) = 0$$

Therewith the original problem can be rewritten as an optimization problem in an n+m dimensional space (which has an only modestly increased dimension) wherein a state, for example the state of the temperature field is represented by a state vector $z_T^k$ for point in time k that can be denoted as follows:

$$z_T^k = \begin{bmatrix} T^{k+1} \\ q_T^k \end{bmatrix} \quad (6)$$

$$[A_T^k(u,v,w) \quad -B_T^k] z_T^k - b'_T(T^k, e_T^k) = 0$$

Therein $B_T^k$ is a matrix that maps the thermal source terms to the cell temperatures or wall temperatures directly actuated by the actuators. This matrix, although possibly a function of point in time k, usually is constant and can be easily derived from the energy equation.

The energy equation is then rewritten as an optimization problem, as follows:

$$z_T^* = \arg\min([S_T^{k+1}O]z_T - \tilde{T}^{k+1})^T Q_T^k \\ ([S_T^{k+1}O]z_T - \tilde{T}^{k+1}) + ([OI]z_T)^T R_T^k ([OI]z_T) \quad (7a)$$

Subject to $[A_T^k - B_T^k]z_T - b'_T(T^k, e_T^k) = 0 \quad (7b)$

Therein $S_T$ is a pattern matrix selecting those cells having a thermal setpoint, I is the identity matrix, O is the 0 matrix and $Q_T^k$ and $R_T^k$ are weighting matrices for tracking and energy consumption respectively.

Similarly, the three equations for the momentum can be replaced by the equations 8a, 8b, 9a, 9b and 10a, 10c below. Therein the functions $b_u(\ )$, $b_v(\ )$, $b_w(\ )$ are rewritten as a linear combination in a manner similarly to those presented for the energy equation. It is noted that the vector $b_w(\ )$ is also a function of the temperature T.

$$z_u^* = \arg\min([S_u^{k+1}O]z_u^k - \tilde{u}^{k+1})^T Q_u^k \\ ([S_u^{k+1}O]z_u^k - \tilde{u}^{k+1}) + ([OI]z_u^k)^T R_u^k ([OI]z_u^k) \quad (8a)$$

Subject to: $[A_u^k - B_u^k]z_u - b'_u(u^k, e_u^k) = 0 \quad (8b)$ $$z_v^* = \arg\min([S_v^{k+1}O]z_v - \tilde{v}^{k+1})^T Q_v^k ([S_v^{k+1}O]z_v - \tilde{v}^{k+1}) + \\ ([OI]z_v)^T R_v^k ([OI]z_v) \quad (9a)$$

Subject to: $[A_v^k - B_v^k]z_v - b'_v(v^k, e_v^k) = 0 \quad (9b)$ $$z_w^* = \arg\min([S_w^{k+1}O]z_w - \tilde{w}^{k+1})^T Q_w^k \\ ([S_w^{k+1}O]z_w - \tilde{w}^{k+1}) + ([OI]z_w)^T R_w^k ([OI]z_w) \quad (10a)$$

Subject to: $[A_w^k - B_w^k]z_w - b'_w(w^k, e_w^k, T^k) = 0 \quad (10b)$

Furthermore the equation for calculating the pressure p is rewritten as $$z_P^* = \arg\min([S_P^{k+1}O]z_P - P^{k+1})^T Q_P^k \\ ([S_P^{k+1}O]z_{P'} - P^{k+1}) + ([OI]z_{P'})^T R_{P'}^k ([OI]z_{P'}) \quad (11a)$$

Subject to: $[A_P^k - B_P^k]z_P - b'_P(P^k, e_P^k) = 0 \quad (11b)$

The pattern matrix $S_P^k$ may be the same in each of the above-mentioned equations, when it is presumed that the same cells are selected for setting the thermal setpoint and for the setpoints of the momentum. Alternatively mutually different cells may be selected for the setpoints of the various climate related variables by defining different pattern matrices $S_T^k$, $S_u^k$, $S_v^k$ and $S_w^k$ for example.

It is noted that for those fields that are not directly controlled, the linearly constrained quadratic optimization problem reduces to a linear equation. By way of example the climate variable fields u,v,w may be directly controlled by fans, while the pressure field P is indirectly affected by these actuators.

As indicated above, the weighting matrices $Q_\Phi$ and $R_\Phi$, which may be changed as a function of time, respectively specify the relative importance that is attached to the accuracy with which the solution approaches the specified setpoint and the degree to which the solution complies with energy consumption budgets. A weighting matrix $Q_\Phi$ is also denoted as a tracking matrix as it influences the tracking of the setpoints specified for the relevant field $\Phi$. This matrix usually only has entries on the diagonal. Having a higher entry on a particular element of the diagonal w.r.t. the other elements on the diagonal means that the climate control system will focus more on the setpoint corresponding to that matrix element. Also $R_\Phi$ will typically be diagonal, for example in the form of a scaled identity matrix with one scalar scaling factor. These matrices may have a predetermined values but alternatively an operator may be allowed to change these matrices. For example, in a greenhouse accommodating a climate sensitive crop the weighting matrix $Q_\Phi$ may be specified that guarantees that the controlled field accurately matches the specified field. Alternatively, if it is known that a relatively insensitive crop is grown and a low energy consumption is desired the weighting matrix $R_\Phi$ may be specified in accordance with this desire. The setting of the weighting matrices for the various fields may differ. For example, because given a certain energy budget a field $\Phi 1$ may be more easily controlled to match the setpoint than another field $\Phi 2$. In an embodiment the user may have a control input to set the scalar scaling factor referred to above to tune the climate control system between 'quality' and 'eco' mode. The matrices $Q_\Phi$ and $R_\Phi$ may be set as a function of time, in which they are denoted as $Q_\Phi^k, R_\Phi^k$.

It is noted that the climate control method, climate control system and the data processor serving as a controller therein can either be used in a steady state mode or in a dynamic mode. In the dynamic mode the setpoints for the climate related variables and/or the values of the boundary conditions may change as a function of time. In the steady state mode, the setpoints for the climate related variables as well as the values of the boundary conditions are presumed constant. As the steady state solution is independent on the initial state of the indoor climate the steady state operational mode does not require a measurement facility to measure the state. Nor are processing facilities required to process the measured values. For the equations 7b, 8b, 9b, 10b, 11b this implies that the matrices $B_x$ are zero matrices for the respective variables T,u,v,w and P indicated by x. The steady state solution will indicate the source terms with which the climate control system will eventually reach the setpoints. (This may be on a large time scale)

It is noted that the climate control system may be operated according to various use modes. In one of these use modes the vector $\tilde\Phi$ specifying a setpoint and the boundary conditions $e_\Phi^k$ are provided as constants. Therewith a steady state solution can be calculated. According to another use mode the vector $\tilde\Phi$ specifying a setpoint and/or the boundary conditions $e_\Phi^k$ are provided as variables so that the climate control system can respond to changing circumstances e.g changes in boundary requirements. In addition the climate control system can take into account measured values for the climate variables to be controlled, therewith allowing for a correction due to possible mismatches between the real indoor climate and the model thereof used in the calculations. To that end the climate control system may look ahead one time step. I.e. in that use mode the set of equations is jointly resolved for one time step at a time. In that case the climate control system will attempt to achieve the setpoints in a single time step. This may lead to overshoots if a change in boundary conditions for example a rising sun already would have contributed to achieving the setpoints or because of delayed effects after k+1 of the actuation that are not taken into account.

Alternatively, predicted values may be used to even better respond to changing circumstances. I.e. according to this alternative the set of equations is jointly resolved for a plurality of time steps and based on predicted values for the vector $\tilde\Phi$ specifying the setpoint and/or the boundary conditions $e_\Phi^k$. In this way the system avoids an overshoot by anticipating predicted changes in boundary conditions and delayed effects of actuation. This is known as Model Predictive Control (MPC). Also hybrid solutions are possible, wherein the climate controller operates for example according to the last use mode to efficiently and rapidly obtain a desired state of the climate and subsequently operates according the first mentioned use mode to maintain that desired state.

BRIEF DESCRIPTION OF THE DRAWINGS

These and other aspects are described in more detail with reference to the drawing. Therein.

DETAILED DESCRIPTION OF EMBODIMENTS

Like reference symbols in the various drawings indicate like elements unless otherwise indicated.

Figure 1A:
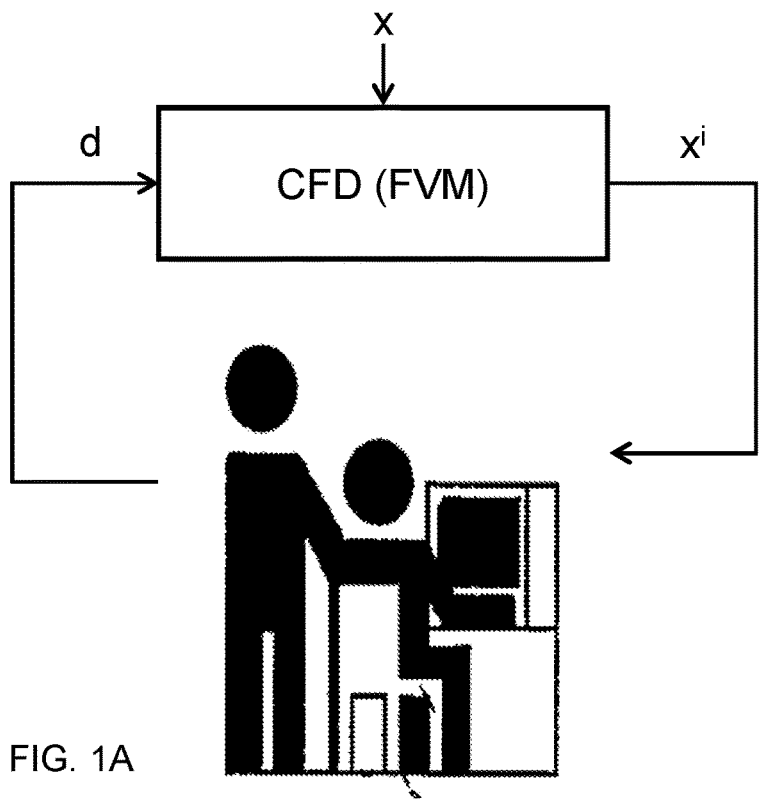
FIG. 1A schematically shows a prior art method for designing an indoor climate control system.
Figure 1B:
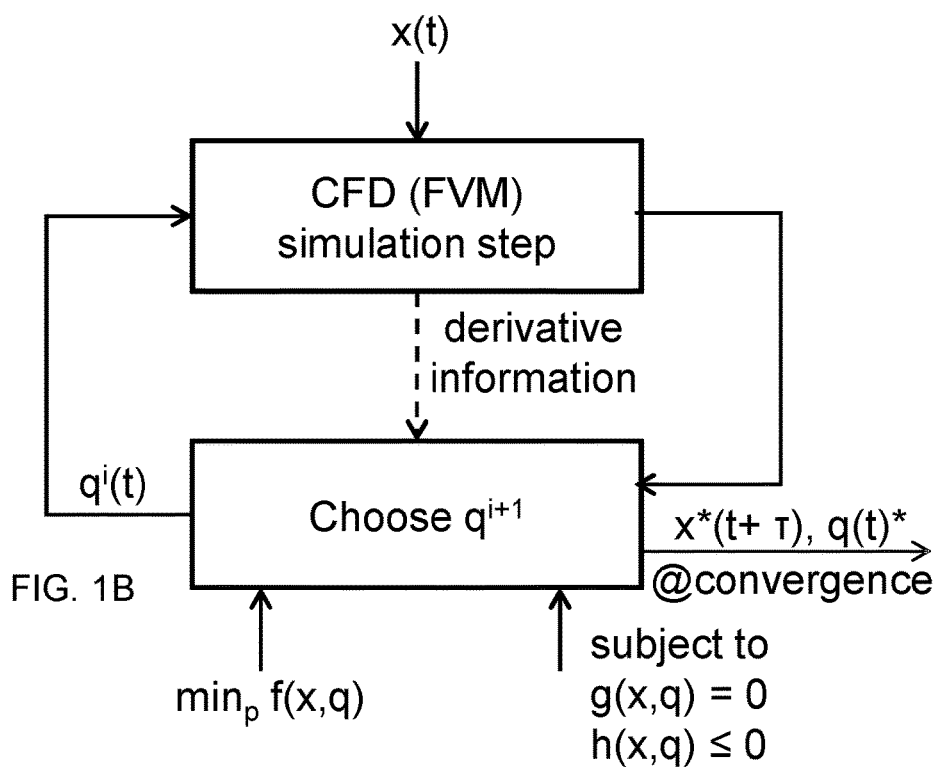
FIG. 1B: schematically shows a prior art method for real-time control of an indoor climate, FIG. 2 schematically shows an embodiment of a climate control system according to the first aspect of the present invention.
Figure 2:
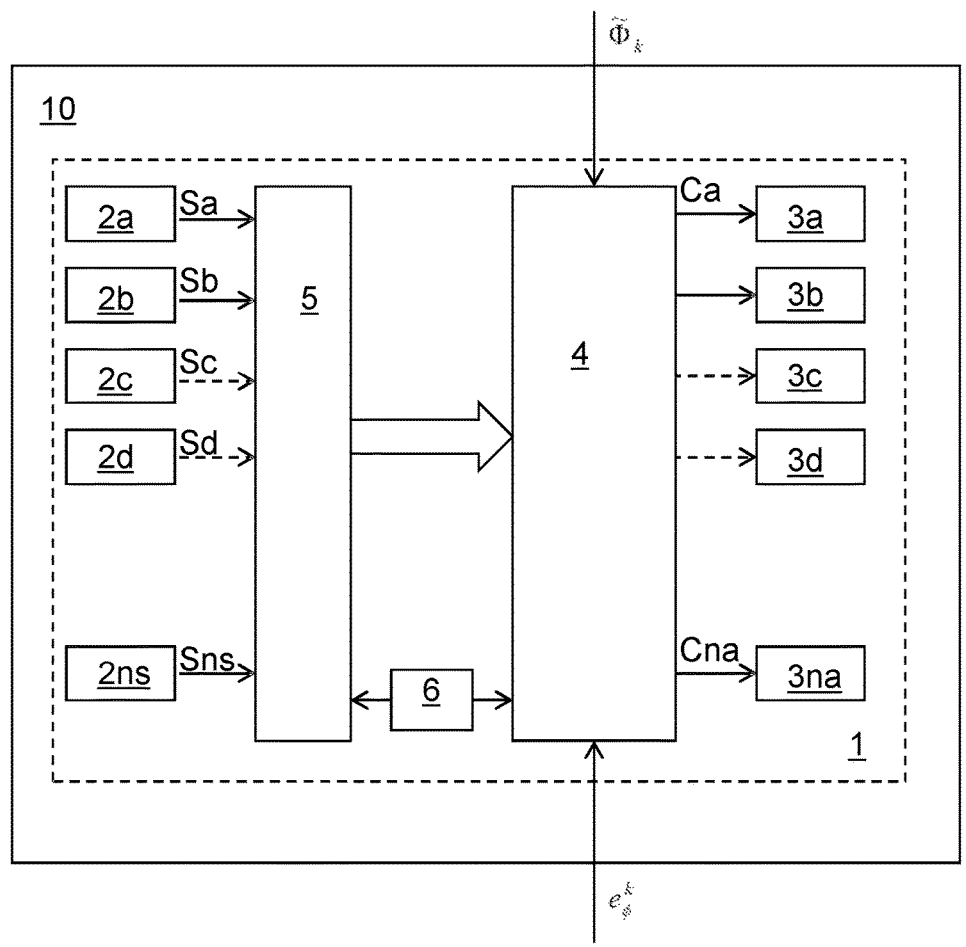

FIG. 2 schematically shows a climate control system 1 for controlling a climate in an indoor space 10. The climate control system comprises a plurality of sensors 2a, . . . 2ns to sense climate related variables in said indoor space, and to provide sensory data Sa, . . . Sn indicative for sensed values for said variables. The climate control system further comprises a plurality of actuators 3a, . . . , 3na for controlling climate related variables in said environment. A data processor 4, here serving as a controller, controls the actuators 3a, . . . , 3na on the basis of the sensory data Sa, . . . Sns.

To that end the controller 4 jointly resolves a set of coupled optimization problems of the following form:

$$z_\Phi^k = \arg\min([S_\Phi^{k+1}O]z_\Phi - \tilde{\Phi}^{k+1})^T Q_\Phi^k$$
$$([S_\Phi^{k+1}O]z_\Phi - \tilde{\Phi}^{k+1}) + ([OI]z_{101})^T R_\Phi^k ([OI]z_\Phi)) \quad (5a)$$

Subject to $\lfloor A_\Phi^k - B_\Phi^k \rfloor z_\Phi - b'_\Phi^k (\Phi^k, e_\Phi^k) = 0$ (5b)

Therein, $$\tilde{z}_\Phi^k = \begin{bmatrix} \Phi^{k+1} \\ q_\Phi^k \end{bmatrix}$$

is an estimated optimum value for the augmented state vector, $\Phi^*$ specifying the spatial distribution of a climate related variable with respect to a plurality of spatial cells and $q_\Phi^k$ being a source term to be resolved that is associated with said vector. Furthermore, $\tilde{\Phi}$ is a vector specifying a setpoint for said climate related variable for at least a part of said plurality of cells. S is a selection matrix, selecting cells for said distribution having a setpoint, O is the zero matrix, I is the identity matrix and Q and R are weighting matrices. These matrices Q, R respectively specify the relative weighting applied to the accuracy with which the vector found as a result of the solution of the optimization problem matches the set-points and the accuracy with which the energy consumption restrictions are met by the solution.

Furthermore, $A_\Phi$ is a matrix that defines the development of a vector $\Phi$ as a function of one or more other vectors of climate related variables and $B_\Phi$ is a matrix that maps the source terms for field $\Phi$ to the cell field values affected by those source terms. The controller controls the plurality of the actuators $3a$ to $3m$ in accordance with the source term $q_\Phi$ found by resolving the above-mentioned optimization problem.

The climate control system 1 may control one or more variables s of the indoor climate in the indoor space 10. Example of said variables, are a temperature distribution, a pressure distribution, flow fields, an air humidity distribution etc. The actuators $3a, \ldots, 3na$ of the climate control system 1 to control one or more of these variables may include for example one or more of heaters, air-conditioners, ventilators, pumps, humidifiers, dryers, etc. The sensors $2a, \ldots, 2n$ used to measure a current state of the climate may include thermal sensors, flow sensors, pressure sensors, air humidity sensors etc.

Typically, the number of sensors $2a, \ldots, 2n$ is less than the number of cells involved in the computation. In the embodiment shown, the climate control system 1 further includes a mapping unit 5 that estimates a current value of a field for each cell on the basis of the sensed values for the field as obtained from the sensors. The mapping unit 5 may for example provide the estimation on the basis of an interpolation of sensed values.

In the embodiment the controller 4 and the mapping unit 5 are programmable devices. In this case the system 1 as shown includes a computer program product 6 that comprises a program for controlling the controller 4 and the mapping unit 5. Alternatively, the controller 4 and/or the mapping unit 5 may be provided as dedicated hardware or as a combination of dedicated hardware and programmable elements.

Figure 3:
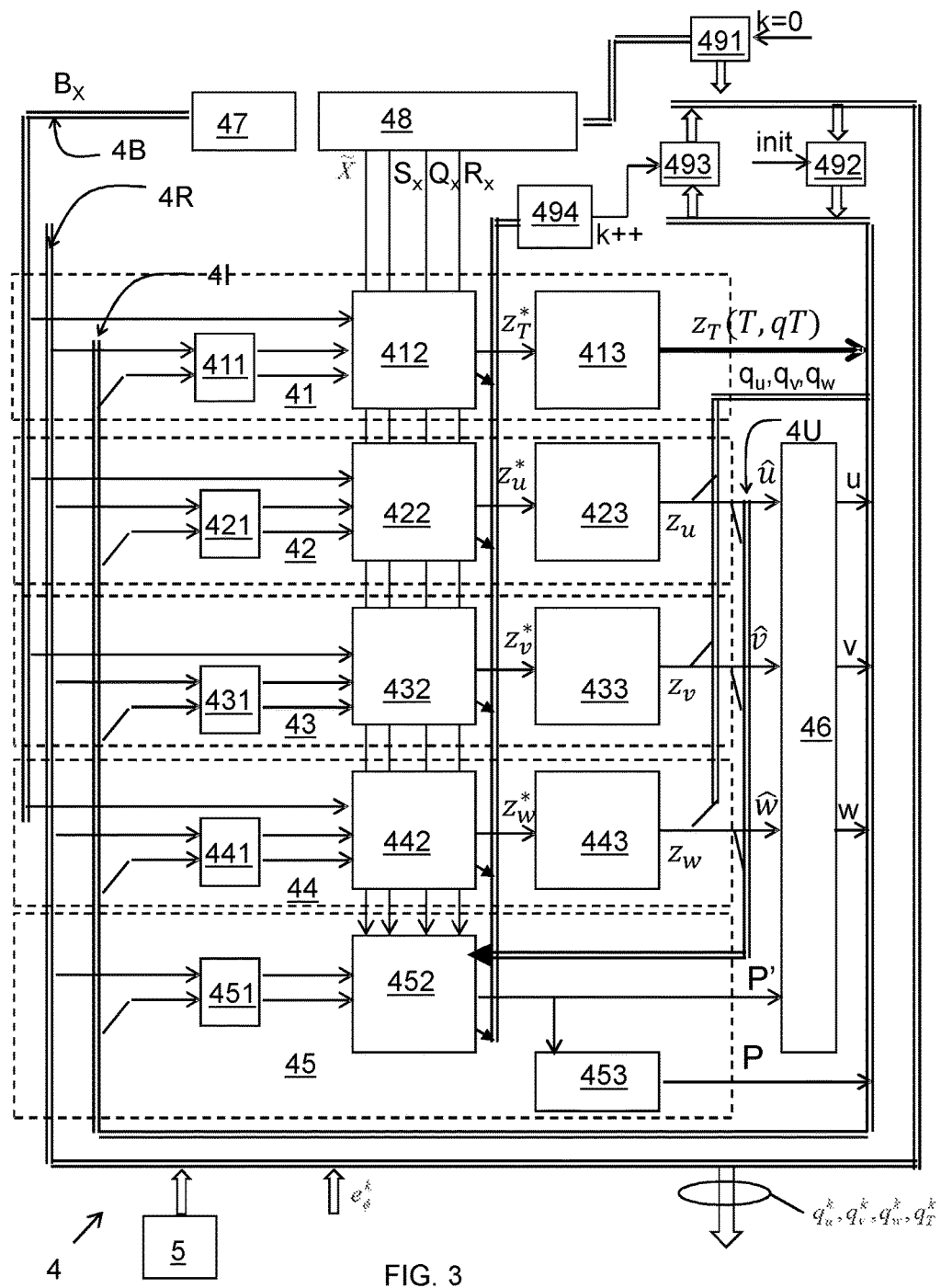
FIG. 3 shows a data processor according to the second aspect of the invention for use in a climate control system according to the first aspect of the invention.
Figure 4:
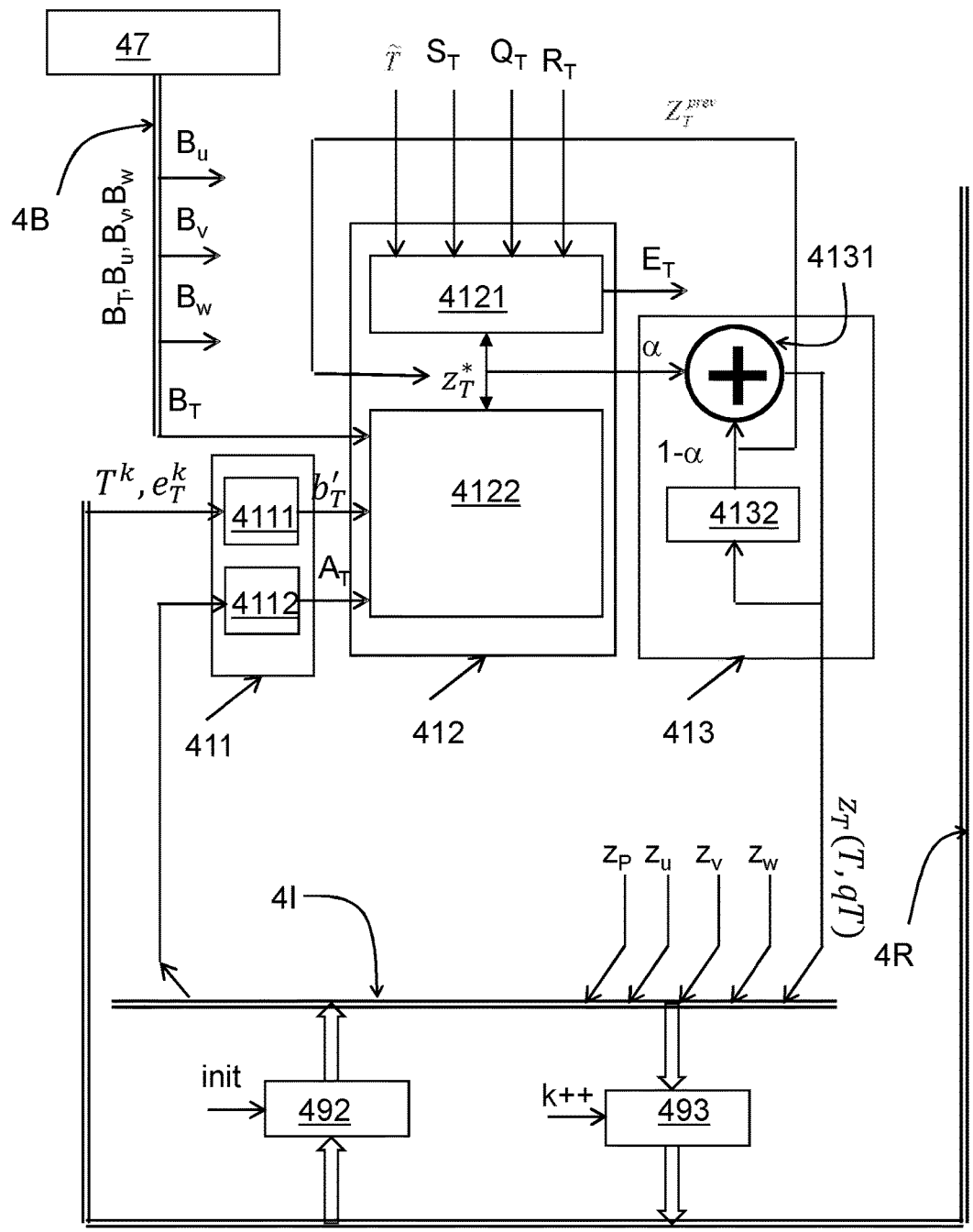
FIG. 4 shows an embodiment of a module of the data processor according to FIG. 3.
Figure 5:
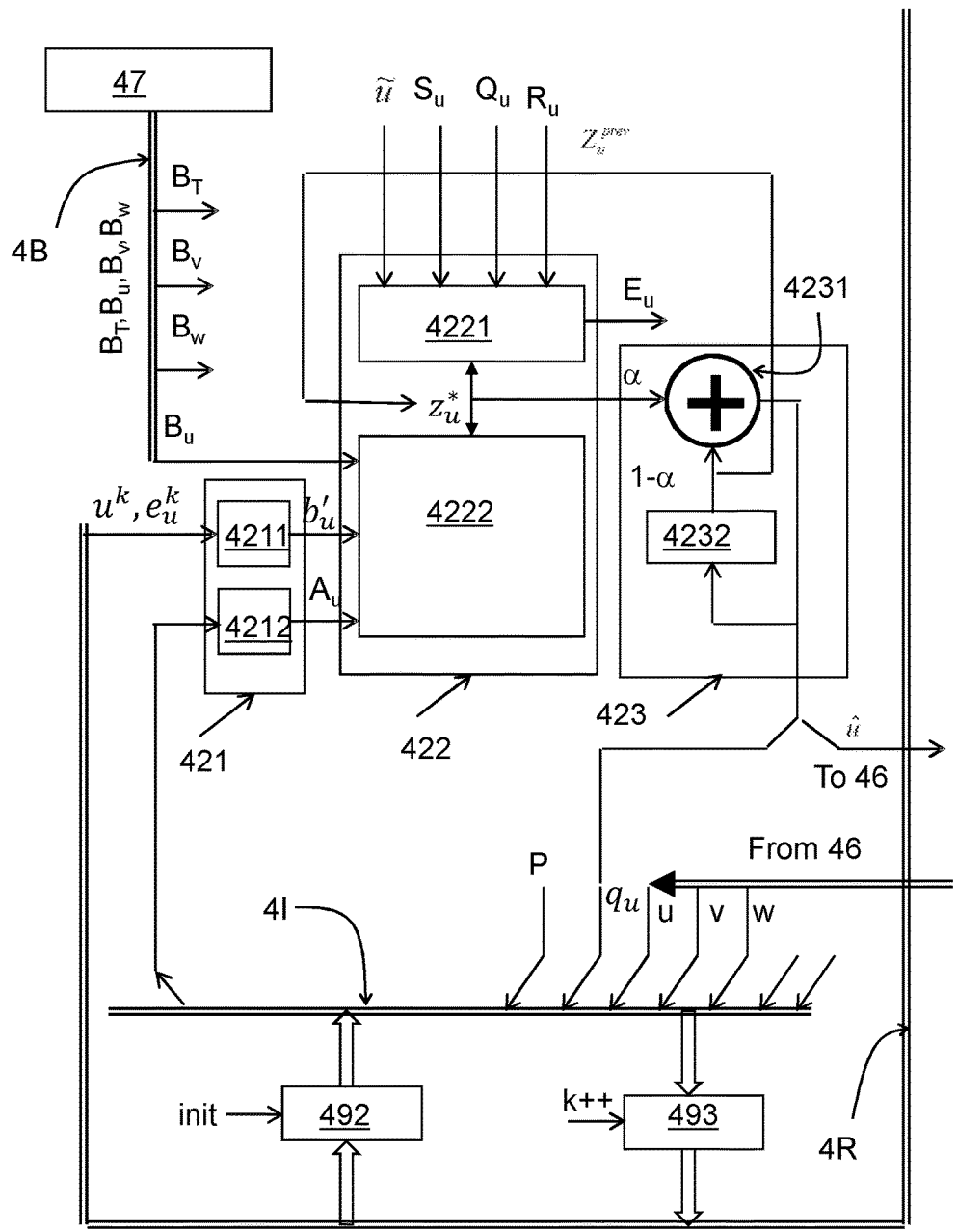
FIG. 5 shows an embodiment of another module of the data processor according to FIG. 3.
Figure 6:
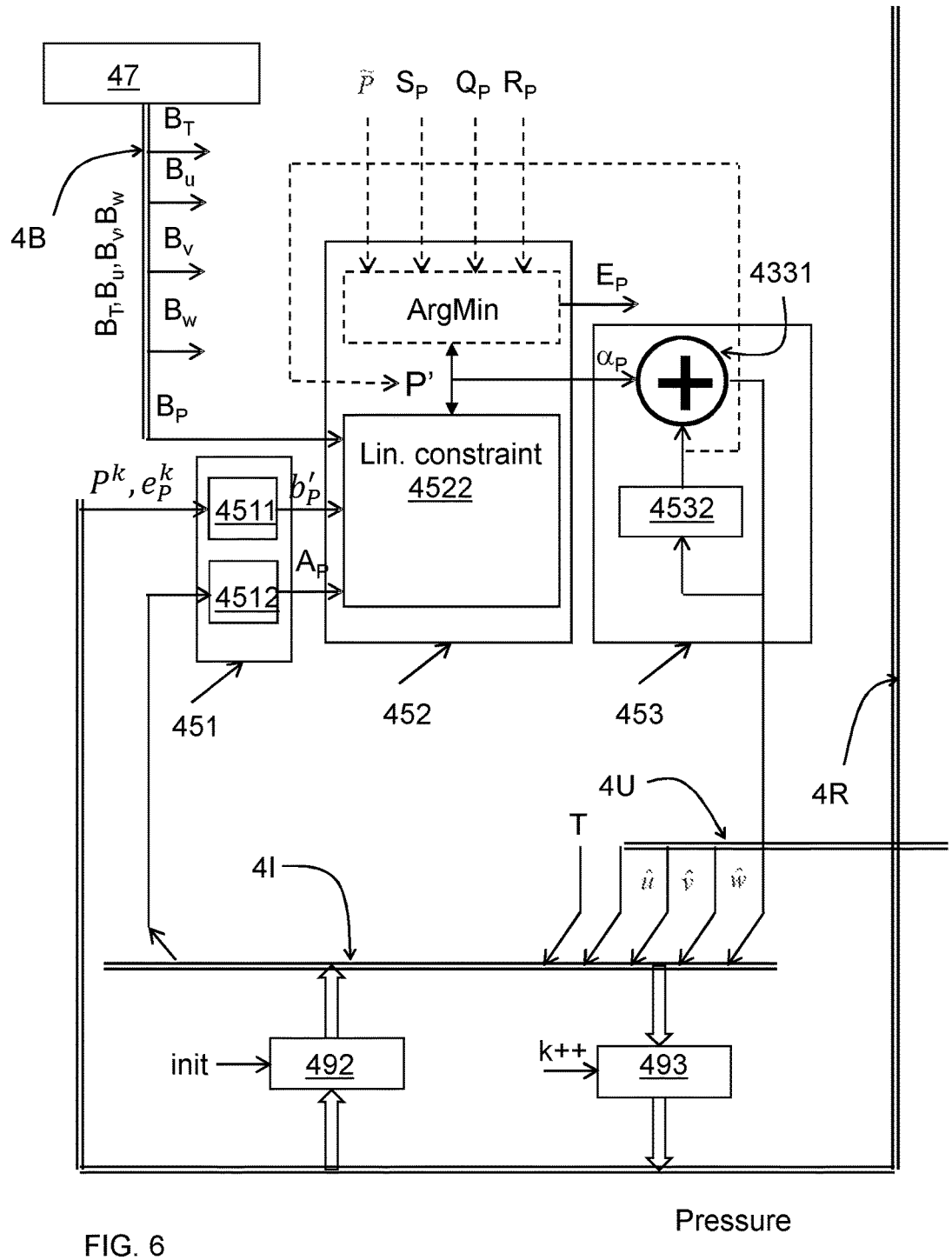
FIG. 6 shows an embodiment of again another module of the data processor according to FIG. 3, FIG. 7A, 7B schematically show parts of the data processor according to FIG. 3.

An embodiment of the controller 4 is shown in more detail in FIG. 3. Dependent on the number of climate variables that have to be controlled, the controller 4 may include a different number of modules that are mutually inter connected. In the embodiment shown the controller 4 comprises a temperature data processing module 41, a first, a second and a third flow data processing module 42, 43, 44 and a pressure data processing module 45. These modules each include a preparation unit (411, 421, 431, 441 and 451 respectively), a solve unit (412, 422, 432, 442 and 452 respectively), and an update unit (413, 423, 433, 443 and 453 respectively). Embodiments of these modules are described with reference to FIGS. 4, 5 and 6. Therein FIG. 4 shows the temperature data processing module 41 in more detail. FIG. 5 shows the first flow data processing module 42 in more detail. The other two flow data processing modules 43, 44 substantially correspond to the first flow data processing module 42. However, in the third flow data processing module 44 the components of the vector $b'_w$ are also dependent on the temperature field to take into account buoyant convection effects. FIG. 6 shows the pressure data processing module 45 in more detail.

The controller further includes a correction module 46 that corrects the flow fields estimated by the flow data processing modules 42, 43, 44.

The controller 4 further includes a source mapping module 47 that generates matrix data that map the source terms to the variables directly actuated by the actuators represented by the source terms.

The controller 4 further includes a user input module 48, enabling a user to control operation of the system.

Figure 8:
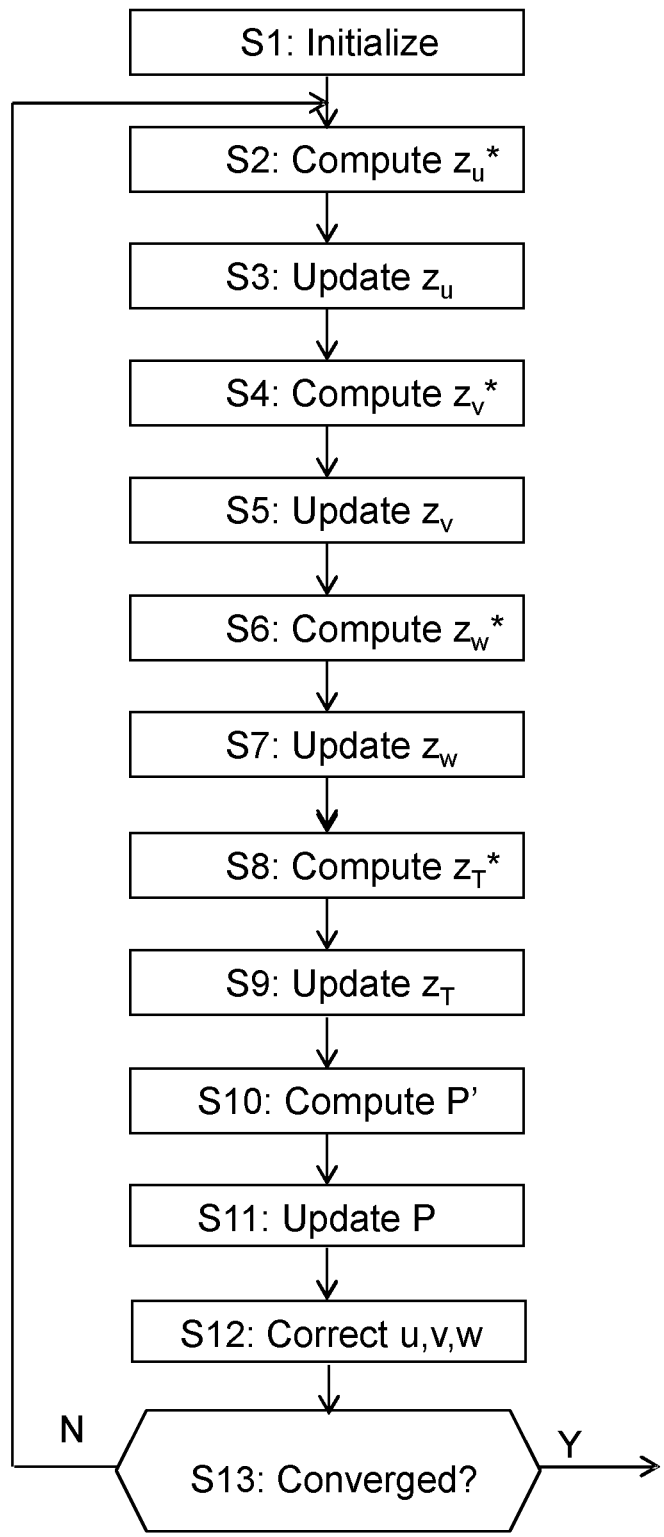
FIG. 8 shows a control method according to the third aspect of the present invention.

The controller 4 further comprises datapath facilities 4R, 4I, 4C, 4B, 4U and datapath control elements 491, 492, 493, 494, Operation of the controller 4 in the system 1 is now described with reference to a flow chart shown in FIG. 8. The flow chart illustrates an iterative procedure with which the values for the source terms that are required to approach the specified set points for climate related variables. Upon convergence of the procedure the values for the source terms for a time step k become available, and the procedure can be repeated to determine the source term values for the next time step k+1.

In the embodiment shown the controller 4 is arranged as a programmable general purpose processor. The controller 4 is coupled to memory 6 comprising a computer program that causes the programmable processor to carry out the climate control method.

In an optional first step S1 all variables are assigned an estimated or known initial value where possible. Variables for which a value is not known or can be estimated, are assigned a random value. If available, however, the known or estimated value should be used to obtain a more rapid convergence. In the embodiment of FIG. 3, this is achieved by transferring the initial values via data path control element 491, responsive to signal "k=0", to a results bus 4R. Subsequently these values are gated to the iterands bus 4I by data path control element 492, responsive to signal "init".

If values are available that are obtained in a previous time step k, it suffices to gate these values to the iterands bus 4I by data path control element 492.

Subsequently the sequence of steps S2-S11 is iterated until convergence is detected in step S12. Therewith the results for the next time step k+1 are obtained.

In step S2 the value for $z_u^*$, i.e. the estimated optimum value for $z_u$ is calculated using equations (8a) and (8b), together forming a linearly constrained quadratic problem with a solve unit 422 of flow data processing module 42. The value $z_u$ is an estimation for the optimum value. The actual value for the optimum will in practice deviate from this deviation due to the mutual influences of the various climate related fields. Upon convergence during subsequent iterations the estimated optimum approaches the actual optimum.

Schematically it is shown that the solve unit 422 has two mutually cooperating parts 4221 and 4222, wherein part 4221 searches for the value $z_u^*$ that minimizes the result of equation 7a, and wherein part 4222 restricts the possible solutions to the linear constraint set by equation 7b. Parts 4211 and 4212 of the preparation unit respectively compute the vector $b'_u$ and the matrix $A_u$ to be used by part 4222. In practice however, different implementations are possible and known to solve a linearly constrained quadratic problem.

The matrices Su, Qu and Ru, as well as the set point for $\tilde{u}$ for the field u are provided by the user input module 48. The matrix Bu is provided by source mapping module 47 via bus 4B. The vector $b'_u(u^k, e_u^k)$ is calculated by preparation part 4221 from the flow field $u^k$ and the prevailing boundary conditions $e_u^k$ at point in time k. It suffices to perform these calculations at the onset of each series of iterations as the values for $u^k$ and $e_u^k$ are defined as constants during time step k. Part 4212 of preparation unit 421 calculates matrix A from the current values of the iterands u,v,w and P available on iterand bus 4I.

The optimum value $z_u^*$ found by solve unit 422 is provided to the update unit 423.

In step S3 the update unit 423 (having adder 4231 and storage element 4232) uses this value $z_u^*$ to update the value for $z_u$ (in storage element 4232) comprising the values for $\hat{u}$ and $q_u$ using:

$$z_u = (1-\alpha)z_u + \alpha z_u^* \tag{12}$$

Therein $\alpha$ is a relaxation parameter, which is for example selected in the range of 0 to 1, preferably in the range of 0.1 to 0.6, for example a value of about 0.4.

Similarly, flow data processing module 43 calculates the value for $z_v^*$ in step S4, using equations (9a) and (9b), and the value for $z_v$ comprising the values for $\hat{v}$ and $q_v$ in step S5 using:

$$z_v = (1-\alpha)z_v + \alpha z_v^* \tag{13}$$

The units 431, 432 and 433 of flow data processing module 43 correspond to the units 421, 422 and 423 of flow data processing module 42.

Similarly, flow data processing module 44 calculates the value for $z_w^*$ in step S6 using equations (10a) and (10b), and the value for $z_w$ comprising the values for $\hat{w}$ and $q_w$ in step S7 using:

$$z_w = (1\alpha)z_w + \alpha z_w^* \tag{14}$$

The units 442 and 443 of flow data processing module 44 correspond to the units 422 and 423 of flow data processing module 42.

The unit 441 of flow data processing module 44 corresponds to the unit 421 of flow data processing module 42 except for the fact that the part of preparation unit 441 that corresponds to the part 4112 of preparation unit 411 differs in that it also uses the current value of the iterand T for the calculation of vector $b'_w$. This is because a relatively strong relationship exists between flows in a vertical direction and the temperature distribution.

It is noted that in the embodiment shown the corrected values u,v,w of the iterands for the flow fields as determined by correction module 46 are used for the calculation of the matrices Au, Av, Aw. However, in an alternative embodiment, the uncorrected values $\hat{u}, \hat{v}, \hat{w}$ may be used instead to calculate these matrices, as upon convergence, the corrected and uncorrected velocities are equal to each other. This may however slightly slow down convergence.

Next in step S8 temperature data processing module 41 calculates the value for $z_T^*$ using equations (7a) and (7b), and calculates the value for $z_T$ comprising the values for T and $q_T$ in step S9 using:

$$z_T = (1-\alpha)z_T + \alpha z_T^* \tag{15}$$

In the embodiment shown the solve unit 412 having parts 4121 and 4122 provides the solution $z_T^*$. Parts 4111 and 4112 of preparation unit 411 respectively calculate the vector $b'_T$ and matrix $A_T$ used by the solve unit 412. The update step is conducted by update unit 413 having an adder 4131 and a storage element 4132 for storing the value $z_T$.

These calculations substantially correspond to those described for the calculations relating to the flow fields u, v, w described above. Also the components of the temperature data processing module 41 as shown in FIG. 4 correspond to those of the flow data processing module 42 as shown in FIG. 5. Therein components of the temperature data processing module 41 that correspond to those of the flow data processing module 42 are referred by a reference number having a second digit that is 1 instead of 2.

Next in step S10 the value for P' is calculated as follows:

$$A_P(\hat{u}, \hat{v}, \hat{w})P' = b_P(\hat{u}, \hat{v}, \hat{w}) \tag{3}$$

Parts 4511 and 4512 of preparation unit respectively calculate the vector $b'_P$ and the matrix $A_P$.

In the present embodiment, the pressure P is not actively controlled. Accordingly, it suffices to solve the above-mentioned linear equation. Hence the solve unit 452 of the pressure data processing module only has a linear equation solving part 4522 as schematically illustrated in FIG. 6. Nevertheless in other embodiments the pressure P may be actively controlled. In that case the solve unit 452 of the pressure data processing module may also have an optimization part 4521 analogous to those used in the flow data processing modules and the temperature data processing modules.

And in step S11 the value for P is updated by update unit 453 (having adder 4331 and a storage element 4332 for the value P) as:

$$P = P + \alpha_P P' \tag{3a}$$

Therein $\alpha_P$ is a relaxation parameter, which is for example selected in the range of 0 to 1, preferably in the range of 0.1 to 0.6, for example a value of about 0.4.

The above-mentioned steps may also be performed according to another sequence, provided that the update step follows the step for calculating the *value for the estimated optimum.

The above-mentioned steps are followed by a correction step S12 involving the following calculation for updating the values for u, v and w:

$$(u,v,w) = f(\hat{u}, \hat{v}, \hat{w}, P') \tag{4}$$

This correction step is described in more detail in: Suhas V. Patankar, "Numerical Heat Transfer and Fluid Flow", ISBN 0-07-1980 048740-S, pp. 123-134.

In the embodiment of the data processor 4 shown in FIG. 3, this correction step is performed by the correction module 46.

In Step S13 it is verified whether the procedure has converged or not. Verification may take place, for example by comparing the differences between the updated values for the variables to be optimized and their previous values $z_\phi^{prev}$ with respective threshold values.

According to a more reliable test it is verified if the previously found values for the state vector $z_\phi^{prev}$ sufficiently match each of the updated linear constraints (5b).

I.e. it is verified if $[A_\Phi-B_\Phi]z_\Phi^{prev}-b'_\Phi(\Phi^k,e_\Phi^k)<\eta_\Phi$, wherein $\eta_\Phi$ is a respective threshold value for each of the fields $\Phi$.

Figure 7A:
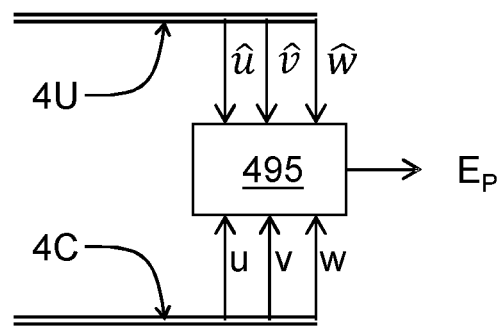

Additionally to verify the convergence of the pressure equation it is determined if the computational error of mass conservation is less than a predetermined threshold value $\eta_P$. In the embodiment shown this is verified by the circuit shown in FIG. 7A, which generates the signal Ep=True iff $$|u-\hat{u}|+|v-\hat{v}|+|w-\hat{w}|<\eta_P \qquad (16)$$

Figure 7B:
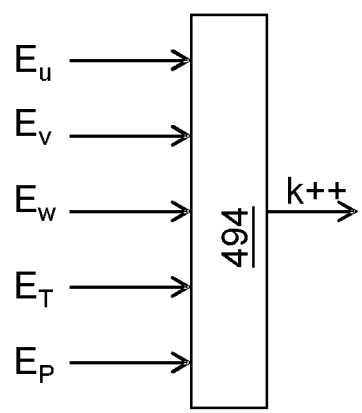

The procedure terminates if the verifications indicate for each of the equations that convergence has occurred, otherwise a following iteration is performed. To that end control element 494, as shown in more detail in FIG. 7B is arranged to issue a signal "k++" indicating global convergence if each of the converge indication signals $E_T$, Eu, Ev, Ew, Ep from the respective field data processing modules 41-45 indicates that convergence occurred for the corresponding monitored field. In response to the signal "k++", the iterand values present on bus 4C are transferred to results bus 4R. The source terms $q_\Phi$ that are transferred as part of the transferred iterand values then can be used for control of the actuators at point in time k.

Upon detection of global convergence the values of the iterands for the various augmented state vectors $z_u, z_v, z_w, z_T, z_P$ are transmitted from the iterand bus 4I via gate 493 as the results $z_u^k, z_v^k, z_w^k, z_T^k, z_P^k$ for the next point in time k on the results bus 4R. Therein the terms $z_\Phi^k$ denote the augmented state vector $[\phi^k, q_\Phi^k]$ The respective source terms $q_\Phi^k$ of the results $z_u^k, z_v^k, z_w^k, z_T^k$ can be used to control the actuators 3a, ..., 3m.

At the next point in time k, the source terms $q_T^k$ may for example control a respective driver that powers heating elements with a supply power that is proportional to the value of $q_T^k$. The source terms $q_u^k, q_v^k, q_w^k$ may control further respective drivers that drive respective fans at a speed proportional to the supplied value for those source terms. In case only stepwise controlled actuators are available, these may be switched on and off in accordance with a duty cycle corresponding to the values of the supplied source terms.

A further embodiment is now described which does not only take into account but also uses predicted input values for the boundary conditions, e.g. based on a weather forecast. In this way the controller may better anticipate to changes of said boundary conditions and/or with more modest energy requirements. This is in particular attractive for control of the temperature as the temperature field of an indoor space reacts relatively slowly to a change in the source settings unless high amounts of energy are allowed.

In this embodiment the augmented state vector $z_\Phi^k$ for point in time k is replaced by a predictive augmented state vector, denoted as $$^{k'}z_\Phi^k = \begin{bmatrix} \phi^{k+k'+1} \\ \vdots \\ \phi^{k+1} \\ q_\Phi^{k+k'} \\ \vdots \\ q_\Phi^k \end{bmatrix}$$

Therein the value k' denotes the number of time steps that is included in the prediction. For k'=0, the predictive augmented state vector reduces to the augmented state vector, i.e.: $^0z_\Phi^k = z_\Phi^k$ The optimization problem to be resolved is now generalized to:

$$^{k'}z_\Phi^k = \arg\min_{z_\Phi}([^{k'}S_\Phi^{k+1k'}O]^{k'}z_\Phi - {}^{k'}\tilde{\Phi}^{k+1})^{Tk'}Q_\Phi^k$$
$$([^{k'}S_\Phi^{k+1k'}O]^{k'}z_\Phi - {}^{k'}\tilde{\Phi}^{k+1}) + ([^{k'}O^kI]^{k'}z_\Phi)^{Tk'}R_\Phi^k$$
$$([^{k'}O^kI]^{k'}z_\Phi)$$

Subject to $$[^{k'}A_\Phi^k \quad -^{k'}B_\Phi^k]^{k'}z_\Phi - {}^{k'}b_\Phi^{\prime\prime k}({}^{k'}e_\Phi^k) - \begin{bmatrix} A_{0,\Phi}^k \Phi^k \\ 0 \\ \vdots \\ 0 \end{bmatrix} = 0$$

The matrices $^{k'}S_\Phi$, $^{k'}O$, $^{k'}I$, $^{k'}Q_\Phi$, $^{k'}R_\Phi$ used in the upper equation are obvious extensions to the matrices $S_\Phi, O, I, Q_\Phi, R_\Phi$ used in equation 5a.

Furthermore the matrices $^{k'}A_\Phi^k$ and $^{k'}B_\Phi^k$ are defined respectively as:

$$^{k'}A_\Phi^k = \begin{bmatrix} A_\Phi^k & 0 & 0 & \ldots \\ -B_{0,\Phi}^{k-1} & A_\Phi^{k-1} & 0 & \ldots \\ \ldots & \ldots & \ldots & \ldots \\ & & B_{0,\Phi}^{k'} & A_\Phi^{k+k'} \end{bmatrix}$$

$$^{k'}B_\Phi^k = \begin{bmatrix} B_\Phi^k & 0 & \ldots & \ldots \\ 0 & B_\Phi^{k+1} & 0 & 0 \\ \ldots & \ldots & \ldots & \ldots \\ 0 & \ldots & \ldots & B_\Phi^{k+k'} \end{bmatrix}$$

Therein:

$$^{k'}b_\Phi({}^{k'}\Phi^k, {}^{k'}q_\Phi^k, {}^{k'}e_\Phi^k) = {}^{k'}B_{0,\Phi}^{k\,k'}\Phi^k + {}^{k'}B_\Phi^{k\,k'}q_\Phi^k + {}^{k'}B_{e,\Phi}^{k\,k'}e_\Phi^k =$$
$$= {}^{k'}B_\Phi^{k\,k'}q_\Phi^k + {}^{k'}b_\Phi^{\prime k}({}^{k'}\Phi_\Phi^k, {}^{k'}e_\Phi^k)$$
$$= {}^{k'}B_{0,\Phi}^{k\,k'}\Phi^k + {}^{k'}B_\Phi^{k\,k'}q_\Phi^k + {}^{k'}b_\Phi^{\prime\prime k}({}^{k'}e_\Phi^k)$$

Hence:

$$^{k'}B_{e,\Phi}^k = \begin{bmatrix} B_{e,\Phi}^k & 0 & \ldots & \ldots \\ 0 & B_{e,\Phi}^{k+1} & 0 & \ldots \\ \ldots & \ldots & \ldots & \ldots \\ 0 & \ldots & \ldots & B_{e,\Phi}^{k+k'} \end{bmatrix}$$

And $$^{k'}e_\Phi^k = \begin{bmatrix} e_\Phi^k \\ e_\Phi^{k+1} \\ \vdots \\ e_\Phi^{k+k'} \end{bmatrix}$$

A system, method and controller analogous to those disclosed above, with reference to FIG. 2-8, can be used to perform the above-mentioned optimization.

In the embodiments discussed above with reference to FIG. 2-8, separate modules are provided for each of the fields involved in the optimization. I.e. the controller 4 comprises a temperature data processing module 41, a first, a second and a third flow data processing module 42, 43, 44 and a pressure data processing module 45. Mutual effects between the various fields are taken into account by the respective preparation units which receive the input data from the other fields. For example, the transition matrix $A_T$ that is used by the solve unit 412 is calculated by part 4112 of the preparation unit 411 for that solve unit 412, takes into account the values of the iterands for the motion fields.

Figure 9:
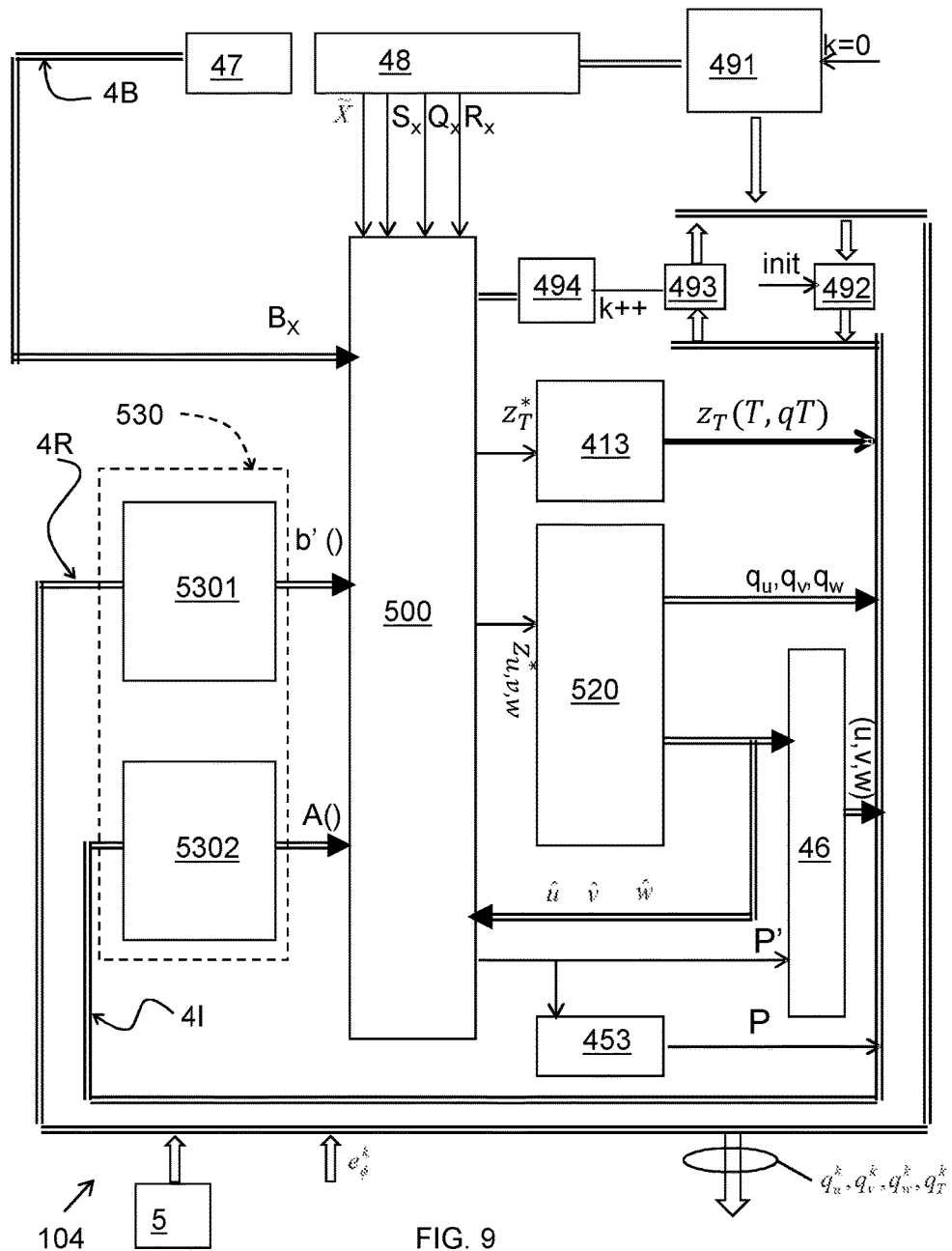
FIG. 9 shows an alternative data processor according to the second aspect of the invention for use in a climate control system according to the first aspect of the invention.

A data processor 104, being an alternative embodiment of the data processor 4 is shown in more detail in FIG. 9. Parts therein corresponding to those in FIG. 3 have the same reference number.

Contrary to the embodiment as specified with reference to FIG. 2-8, the data processor 104 comprises a single data processing module for each of the fields (for example the temperature field, the motion fields and the pressure field) involved. In this case the augmented state variable z to be optimized includes all fields to be optimized as well as all source terms for the fields to be optimized.

Hence, in the data processor as shown in FIG. 9 performs the following optimization.

$$z^* = \arg\min([SO]z - \tilde{x})^T Q([SO]z - \tilde{x}) + ([OI]z)^T R([OI]z) \quad (17a)$$

Subject to $[A - B]z - b'(x^k, e^k) = 0$ \quad (17b)

Wherein:

$$x = (T^T, u^T, v^T, w^T, P^T)^T$$

$$q = (q_T^T, q_u^T, q_v^T, q_w^T, q_P^T)$$

$$e = (e_T^T, e_u^T, e_v^T, e_w^T, e_P^T)$$

$$z = (x^T, q^T)^T$$

For completeness sake it is noted that the notation is used to indicate a single column vector, subsequently including the elements of each of the vectors in the order specified between the brackets.

And further $$Q = \begin{pmatrix} Q_T & 0 & 0 & 0 & 0 \\ 0 & Q_u & 0 & 0 & 0 \\ 0 & 0 & Q_v & 0 & 0 \\ 0 & 0 & 0 & Q_w & 0 \\ 0 & 0 & 0 & 0 & Q_P \end{pmatrix}$$

$$R = \begin{pmatrix} R_T & 0 & 0 & 0 & 0 \\ 0 & R_u & 0 & 0 & 0 \\ 0 & 0 & R_v & 0 & 0 \\ 0 & 0 & 0 & R_w & 0 \\ 0 & 0 & 0 & 0 & R_P \end{pmatrix}$$

$$S = (S_T \; S_u \; S_v \; S_w \; S_P)$$

$$A = \begin{pmatrix} A_T(u,v,w) & 0 & 0 & 0 & 0 \\ 0 & A'_u(u,v,w) & 0 & 0 & A_u^P \\ 0 & 0 & A'_v(u,v,w) & 0 & A_v^P \\ A_w^T & 0 & 0 & A'_w(u,v,w) & A_w^P \\ 0 & A_u^c & A_v^c & A_w^c & 0 \end{pmatrix}$$

In this embodiment the calculation of the source term for each of the actuators includes its direct effect also on related fields in addition the field(s) which are specifically controlled by the actuator. For example a fan, intended to control the motion fields also affects the temperature distribution.

Similarly to what is indicated above for the energy equation (1) is rewritten as described above, the equation 17b can be rewritten as (arguments for the components of matrix A and for the components of vector b not shown):

$$\begin{pmatrix} A_{11} & \cdots & A_{1n} \\ \cdots & \cdots & \cdots \\ A_{n1} & \cdots & A_{nn} \end{pmatrix} \begin{pmatrix} T_1 \\ \vdots \\ T_n \end{pmatrix} = \begin{pmatrix} b_1 \\ \vdots \\ b_n \end{pmatrix}$$

Therein the vector $b_x(x^k, q_x^k, e_x^k)$ is considered a linear function of its arguments that can be written as follows:

$$b_x(x^k, q_x^k, e_x^k) = B_q q_x^k + B_0 x^k + B_e e_x^k = B_q q_x^k + b_x'(x^k, e_x^k)$$

Wherein:

$$B_q = \begin{pmatrix} B_q^T & 0 & 0 & 0 & 0 \\ 0 & B_q^u & 0 & 0 & 0 \\ 0 & 0 & B_q^v & 0 & 0 \\ 0 & 0 & 0 & B_q^w & 0 \\ 0 & 0 & 0 & 0 & B_q^P \end{pmatrix},$$

$$B_0 = \begin{pmatrix} B_q^T & 0 & 0 & 0 & 0 \\ 0 & B_q^u & 0 & 0 & 0 \\ 0 & 0 & B_q^v & 0 & 0 \\ 0 & 0 & 0 & B_q^w & 0 \\ 0 & 0 & 0 & 0 & B_q^P \end{pmatrix}, \text{ and}$$

$$B_e = \begin{pmatrix} B_e^T & 0 & 0 & 0 & 0 \\ 0 & B_e^u & 0 & 0 & 0 \\ 0 & 0 & B_e^v & 0 & 0 \\ 0 & 0 & 0 & B_e^w & 0 \\ 0 & 0 & 0 & 0 & B_e^P \end{pmatrix}$$

Contrary to the previous embodiments the pressure correction equation is not solved. Instead, the continuity equation is directly solved. This is given by the matrices Ac. Flow speeds are weighted by cell areas and all incoming flows per cell are added together. These should all be 0, or, in case of a (controllable) mass source in a cell, a certain value mapped through $B_q^c$ or $B_q^e$. In practice, these last 2 matrices are zero.

The momentum equations are rewritten, so that a mapping matrix for the pressure (and in the z-momentum equation also a mapping for temperature) are extracted.

The matrix A is not of full rank (zeros on the lower right part of the diagonal). It is noted that only the pressure differences rather than the absolute pressure is defined. Typically this information is sufficient for the purpose of calculating the required actuator settings or for determining the required capacity of actuators in a climate control system. Should it nevertheless be desired to calculate the absolute pressure this can be realized by assigning a value to one of the pressures to 'ground' the system. Alternatively, the lower right diagonal (now zeros), may be replaced with an identity matrix with a very small scaling.

Figure 9A:
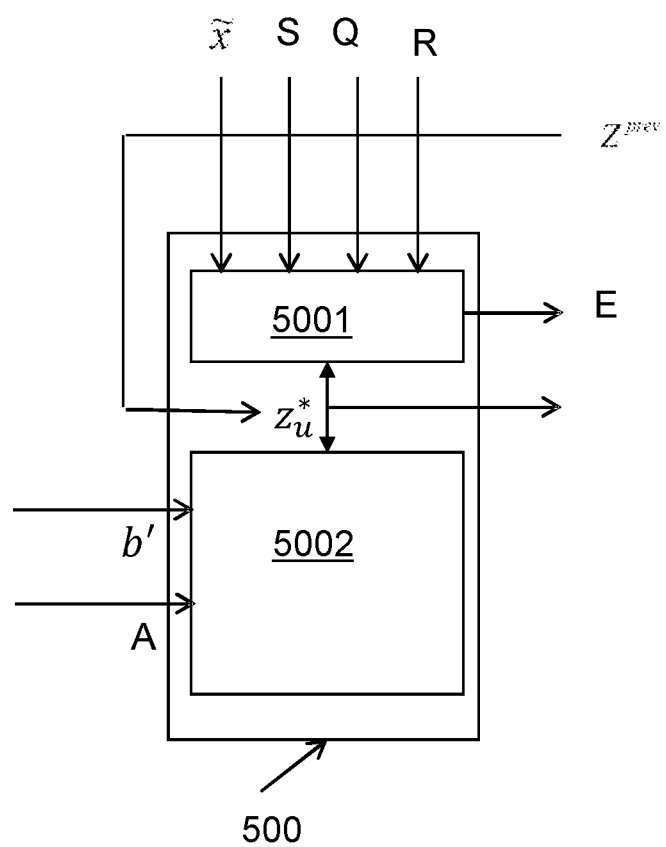
FIG. 9A shows a detail of the data processor of FIG. 9 in more detail.

In the data processor 104 of FIG. 9, the solve unit 500, shown in more detail in FIG. 9A calculates the optimized value z* in accordance with equations 17a, 17b. As in FIG. 4 for example the solve unit 500 has two mutually cooperating parts 5001 and 5002, wherein part 5001 searches for the value z* that minimizes the result of equation 17a, and wherein part 5002 restricts the possible solutions to the linear constraint set by equation 17b. It is noted that other embodiments are possible. A single preparation unit 530 that includes a first part 5301 for calculating the vector $b_u$ and a second part 5302 for calculating the matrix A to be used by the solve unit 500. Update unit 520 includes the update units 423, 433 and 443 as specified for FIG. 3.

Figure 10:
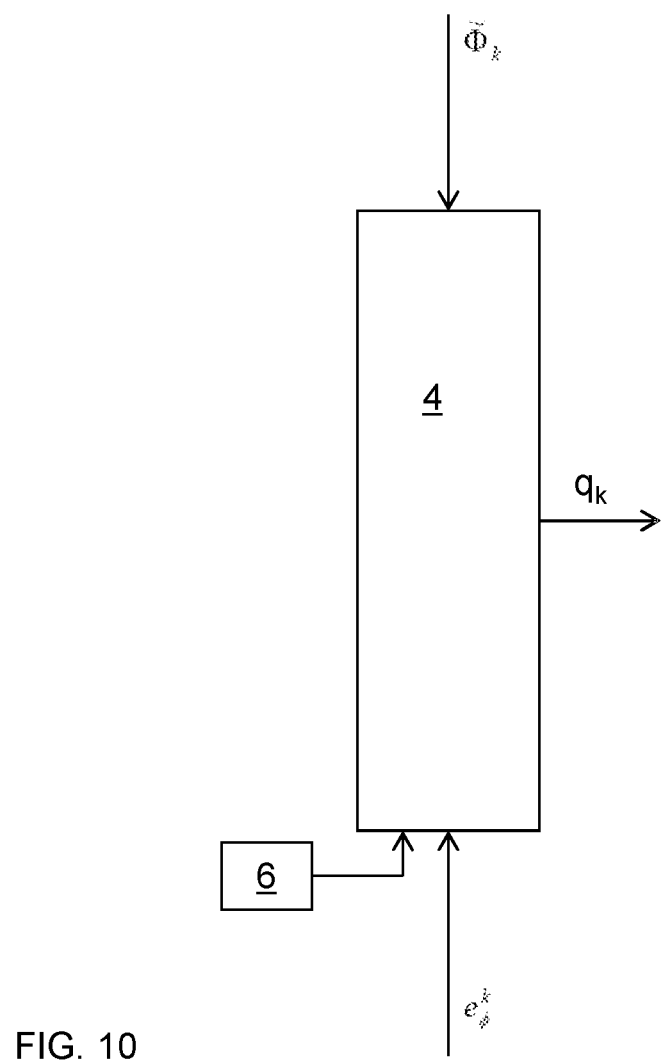
FIG. 10 shows a design system according to the present invention.

It is noted that instead of providing separate modules for each field to be optimized or a single module for all fields, alternative configurations are possible too. For example a shared module may be provided for some of the fields to be controlled, whereas other fields may each have a dedicated module. FIG. 10 shows a design system according to the present invention. The design system comprises a data processor 4 similar to the data processor 4 as described with reference to FIG. 2-8, or similar to the data processor 4 as described with reference to FIG. 9.

During operation the following steps are performed. In a way analogous to one of the method described above, for example the method described with reference to FIG. 8 or the method as performed by the data processor 104 of FIG. 9, a set of values for controlling an indoor climate are calculated. Contrary to the situation as described for these methods however, the values are not used for actual control of actuators, but to simulate the effect of actuators in a model of the indoor climate for which the control system is to be designed. On its turn, the simulated values of the climate related variables that are achieved therewith are provided as input data to the method, instead of using sensed values. The control values $q_k$ that are obtained upon global convergence of the procedure are an indication for the resources that are to be used in an actual control system. For example if it follows from the design process that a certain simulated actuator requires a certain amount of power to achieve the setpoints, it follows that the actuator in question should at least be capable of operation in that power range. Alternatively if it becomes apparent that a certain simulated actuator requires no power at all, it may be concluded that the actuator is not necessary.

As will be apparent to a person skilled in the art, the elements listed in the claims related to the system and the data processor are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. Various steps may be implemented in a sequential manner, but may alternatively be implemented in parallel.

In the apparatus claim enumerating several means, several of these means can be embodied by one and the same item of hardware. For example in the design system the data processor 4 and the simulation processor 8 may be formed by a single hardware item. Such a hardware item may for example alternately compute the data processing steps described in claim 8, and the additional simulation steps described in claim 10. 'Computer program product' is to be understood to mean any software product stored on a computer-readable medium, such as a floppy disk, downloadable via a network, such as the Internet, or marketable in any other manner.

The invention claimed is:

1. A data processor, comprising outputs to provide control signals to one or more actuators, wherein said data processor jointly resolves a set of coupled optimization problems of the following form $$z_\Phi^k = \arg\min_{z_\Phi}([S_\Phi^{k+1}O]z_\Phi - \tilde{\Phi}^{k+1})^T Q_\Phi^k ([S_\Phi^{k+1}O]z_\Phi - \tilde{\Phi}^{k+1}) + ([OI]z_\Phi)^T R_\Phi^k ([OI]z_\Phi)$$

subject to $[A_\Phi^k - B_\Phi^k]z_\Phi - b'^k_\Phi(\Phi^k, e_\Phi^k) = 0$ wherein the control signals are to activate said one or more actuators to change at least one variable of an indoor climate, wherein:

$$z_\Phi = \begin{bmatrix} \Phi \\ q_\Phi \end{bmatrix}$$

is an augmented state-vector comprising a vector $\Phi$ specifying the spatial distribution of a climate related variable with respect to a plurality of spatial cells, and a source term $q_\Phi$ to be resolved, said source term corresponding to an activation of said one or more actuators to result from said control signals and wherein $$z_\Phi^k = \begin{bmatrix} \Phi^{k+1} \\ q_\Phi^k \end{bmatrix}$$

is the solution found for point in time k, $\tilde{\Phi}^{k+1}$ being a vector specifying a setpoint specified for said climate related variable at point in time k+1 for at least a part of said plurality of cells, $e_\Phi^k$ are boundary conditions relevant for said climate related variable at point in time k, S is a selection matrix, selecting cells for said distribution having a setpoint, O is the zero matrix, I is the identity matrix and Q and R are weighting matrices that specify the relative importance attached to tracking the setpoint and complying with energy consumption budgets, respectively, and wherein $A_\Phi$ is a matrix that defines the development of vector $\Phi$ as a function of one or more other vectors of climate related variables, wherein $B_\Phi$ is a matrix that maps the source terms for field $\Phi$ to the cell field values affected by those source terms, and wherein the data processor provides the control signals in accordance with the source term $q_\Phi$.

2. The data processor according to claim 1, wherein jointly resolving the set of coupled optimization problems involves the following steps:

an update step, comprising the following sub-steps to be carried out in arbitrary order, update (S1u) the air velocity field u and associated source term field $q_u$ for a first spatial direction (x) by optimizing the air velocity field u for said direction, update (S1y) the air velocity field v and associated source term field $q_v$ for a second spatial direction (y) by optimizing the air velocity field v for said direction, update (S1w) the air velocity field w and associated source term field $q_w$ for a third spatial direction (z) by optimizing the air velocity field z for said direction, update (S1T) the temperature field T and associated source term field $q_T$ by optimizing the temperature field T, calculate (S2) the pressure field (P),
apply a relaxation step (S3), and
check for convergence, otherwise repeat the previous steps S1-S3.

3. A data processing method for controlling at least one variable of an indoor climate, the data processing method comprising
jointly resolving a set of coupled optimization problems of the following form:

$$z_\Phi^k = \arg\min_{z_\Phi}([S_\Phi^{k+1}O]z_\Phi - \tilde{\Phi}^{k+1})^T Q_\Phi^k ([S_\Phi^{k+1}O]z_\Phi - \tilde{\Phi}^{k+1}) + ([OI]z_\Phi)^T R_\Phi^k ([OI]z_\Phi)$$ (5a)

subject to $[A_\Phi^k - B_\Phi^k]z_\Phi - b'_\Phi^k(\Phi^k, e_\Phi^k) = 0$ wherein:

$$z_\Phi = \begin{bmatrix} \Phi \\ q_\Phi \end{bmatrix}$$

is an augmented state-vector comprising a vector $\Phi$ specifying the spatial distribution of a climate related variable with respect to a plurality of spatial cells, and a source term $q_\Phi$ to be resolved, and
wherein $$\tilde{z}_\Phi^k = \begin{bmatrix} \Phi^{k+1} \\ q_\Phi^k \end{bmatrix}$$

is the solution found for point in time k, $\tilde{\Phi}^{k+1}$ being a vector specifying a setpoint specified for said climate related variable at point in time k+1 for at least a part of said plurality of cells, $e_\Phi^k$ are boundary conditions relevant for said climate related variable at point in time k, S is a selection matrix, selecting cells for said distribution having a setpoint, O is the zero matrix, I is the identity matrix and Q and R are weighting matrices for tracking and energy consumption, and
wherein $A\Phi$ is a matrix that defines the development of vector $\Phi$ as a function of one or more other vectors of climate related variables, and
wherein $B\Phi$ is a matrix that maps the source terms for field $\Phi$ to the cell field values affected by those source terms,
the method further comprising providing control signals in accordance with said source terms, said control signals activating one or more actuators to change said at least one variable of said indoor climate.

4. A method according to claim 3, further comprising
receiving sensory data indicative for sensed values from climate related variables in an indoor space as the data indicative for values of indoor climate related variables, and
driving said one or more actuators by said control signals.

5. The method according to claim 4, comprising providing the vector $\tilde{\Phi}$ specifying a setpoint and the boundary conditions $e_\Phi^k$ as constants.

6. The method according to claim 4, comprising providing the vector $\tilde{\Phi}$ specifying a setpoint and/or the boundary conditions $e_\Phi^k$ as variables.

7. The method according to claim 6, comprising jointly resolving the set of equations for one time step at a time.

8. The method according to claim 6, comprising jointly resolving the set of equations for a plurality of time steps and based on predicted values for the vector $\tilde{\Phi}$ specifying the setpoint and/or the boundary conditions $e_\Phi^k$.

9. The method according to claim 3, wherein the source terms ($q_k$) that are calculated in response to the provided setpoint values ($\tilde{\Phi}_k$) and boundary conditions ($e_\Phi^k$) are indicative for the one or more actuators to be used in a design and their required settings.

10. A climate control system for controlling a climate in an indoor space, comprising
a plurality of sensors configured to sense climate related variables in said indoor space, and to provide, to a controller, sensory data indicative for sensed values for said variables,
a plurality of actuators configured to control said climate related variables in said indoor space, and
the controller configured to jointly resolve a set of coupled optimization problems comprising $$z_\Phi^k = \arg\min_{z_\Phi}([S_\Phi^{k+1}O]z_\Phi - \tilde{\Phi}^{k+1})^T Q_\Phi^k ([S_\Phi^{k+1}O]z_\Phi - \tilde{\Phi}^{k+1}) + ([OI]z_\Phi)^T R_\Phi^k ([OI]z_\Phi)$$

subject to $[A_\Phi^k - B_\Phi^k]z_\Phi - b'_\Phi^k(\Phi^k, e_\Phi^k) = 0$, wherein:

$$z_\Phi = \begin{bmatrix} \Phi \\ q_\Phi \end{bmatrix}$$

is an augmented state-vector comprising
a vector $\Phi$ specifying spatial distribution of a climate related variable with respect to a plurality of spatial cells, and
a source term $q_\Phi$ to be resolved, said source term corresponding to an activation of one or more actuators to result from control signals,
wherein $$\tilde{z}_\Phi^k = \begin{bmatrix} \Phi^{k+1} \\ q_\Phi^k \end{bmatrix}$$

is a solution found for point in time k, $\tilde{\Phi}^{k+1}$ being a vector specifying a setpoint specified for said climate related variable at point in time k+1 for at least a part of said plurality of cells, $e_\Phi^k$ are boundary conditions relevant for said climate related variable at point in time k, S is a selection matrix, selecting cells for said distribution having a setpoint, O is the zero matrix, I is the identity matrix and Q and R are weighting matrices for tracking and energy consumption,
wherein $A_\Phi$ is a matrix that defines the development of vector $\Phi$ as a function of one or more other vectors of climate related variables,
wherein $B_\Phi$ is a matrix that maps the source terms for field $\Phi$ to the cell field values affected by those source terms, and
wherein the controller is further configured to provide said control signals to said plurality of actuators to activate the plurality of actuators, in accordance with the source term $q_\Phi$, to change at least one variable of an indoor climate.

11. The climate control system of claim 10, wherein the controller is configured to jointly resolve the set of coupled optimization problems by:
executing a plurality of update operations in arbitrary order, further comprising updating an air velocity field u and associated source term field $q_u$ for a first spatial direction (x) by optimizing the air velocity field u for said direction, updating an air velocity field v and associated source term field $q_v$ for a second spatial direction (y) by optimizing the air velocity field v for said direction, updating an air velocity field w and associated source term field $q_w$ for a third spatial direction (z) by optimizing the air velocity field z for said direction, and updating a temperature field T and associated source term field $q_T$ by optimizing the temperature field T, calculating a pressure field (P), applying a relaxation operation, and checking for convergence, wherein the controller is otherwise configured to repeat the update operations, calculating the pressure field, and applying the relaxation operation.

12. The climate control system of claim 10, further comprising a mapping unit for mapping said sensory data onto the plurality of cells.

13. The climate control system of claim 10, wherein the vector $\tilde{\Phi}$ specifying the setpoint for said climate related variable is uniform for at least a part of said plurality of cells.

14. The climate control system of claim 10, wherein the vector $\tilde{\Phi}$ specifying the setpoint for said climate related variable is non-uniform for at least a part of said plurality of cells.

15. A design system comprising:

a data processor configured to jointly resolve a set of coupled optimization problems comprising $$z_\Phi^k = \arg\min_{z_\Phi}([S_\Phi^{k+1} O]z_\Phi - \tilde{\Phi}^{k+1})^T Q_\Phi^k ([S_\Phi^{k+1} O]z_\Phi - \tilde{\Phi}^{k+1}) + ([OI]z_\Phi)^T R_\Phi^k ([OI]z_\Phi)$$

subject to $[A_\Phi^k - B_\Phi^k]Z_\Phi - b'_\Phi{}^k(\Phi^k, e_\Phi^k) = 0$, wherein:

$$z_\Phi = \begin{bmatrix} \Phi \\ q_\Phi \end{bmatrix}$$

is an augmented state-vector comprising a vector $\Phi$ specifying spatial distribution of a climate related variable with respect to a plurality of spatial cells, and a source term $q_\Phi$ to be resolved, said source term corresponding to an activation of one or more actuators to result from control signals, wherein $$z_\Phi^k = \begin{bmatrix} \Phi^{k+1} \\ q_\Phi^k \end{bmatrix}$$

is a solution found for point in time k, $\tilde{\Phi}^{k+1}$ being a vector specifying a setpoint specified for said climate related variable at point in time k+1 for at least a part of said plurality of cells, $e_\Phi^k$ are boundary conditions relevant for said climate related variable at point in time k, S is a selection matrix, selecting cells for said distribution having a setpoint, O is the zero matrix, I is the identity matrix and Q and R are weighting matrices for tracking and energy consumption, wherein $A_\Phi$ is a matrix that defines the development of vector $\Phi$ as a function of one or more other vectors of climate related variables, wherein $B_\Phi$ is a matrix that maps the source terms for field $\Phi$ to the cell field values affected by those source terms, wherein the data processor is further configured to provide said control signals to activate a plurality of actuators, in accordance with the source term $q_\Phi$, to change at least one variable of an indoor climate, and wherein the source terms ($q_k$) calculated by the design system in response to the provided setpoint values ($\tilde{\Phi}_k$) and boundary conditions ($e_\Phi^k$) are indicative for the plurality of actuators to be used in the design and their settings.

16. The design system of claim 15, wherein the data processor is configured to jointly resolve the set of coupled optimization problems by:

executing a plurality of update operations in arbitrary order, further comprising updating an air velocity field u and associated source term field $q_u$ for a first spatial direction (x) by optimizing the air velocity field u for said direction, updating an air velocity field v and associated source term field $q_v$ for a second spatial direction (y) by optimizing the air velocity field v for said direction, updating an air velocity field w and associated source term field $q_w$ for a third spatial direction (z) by optimizing the air velocity field z for said direction, and updating a temperature field T and associated source term field $q_T$ by optimizing the temperature field T, calculating a pressure field (P), applying a relaxation operation, and checking for convergence, wherein the controller is otherwise configured to repeat the update operations, calculating the pressure field, and applying the relaxation operation.

17. The design system of claim 16, wherein the data processor is further configured to receive sensory data indicative for sensed values from climate related variables in an indoor space as the data indicative for values of indoor climate related variables, and drive the plurality of actuators by said control signals.

18. The design system of claim 17, wherein the data processor is further configured to provide the vector $\tilde{\Phi}$ specifying a setpoint and the boundary conditions $e_\Phi^k$ as constants.

19. The design system of claim 17, wherein the data processor is further configured to provide the vector $\tilde{\Phi}$ specifying a setpoint and/or the boundary conditions $e_\Phi^k$ as variables.

* * * * *